| (12) | United States Patent | (10) Patent No.: US 12,022,459 B2 |
|---|---|---|
| | Ryu et al. | (45) Date of Patent: Jun. 25, 2024 |

(54) SIDELINK RESOURCE CONFIGURATION FOR A SLOT WITH MULTIPLE MINI-SLOTS AND A FEEDBACK CHANNEL

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Fairless Hills, PA (US); Tao Luo, San Diego, CA (US); Yan Zhou, San Diego, CA (US); Wooseok Nam, San Diego, CA (US); Piyush Gupta, Bridgewater, NJ (US); Xiaojie Wang, Hillsborough, NJ (US); Xiaoxia Zhang, San Diego, CA (US); Peter Gaal, San Diego, CA (US); Juan Montojo, San Diego, CA (US); Hua Wang, Basking Ridge, NJ (US); Chih-Hao Liu, San Diego, CA (US); Jing Sun, San Diego, CA (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 17/483,752

(22) Filed: Sep. 23, 2021

(65) Prior Publication Data

US 2023/0087225 A1 Mar. 23, 2023

(51) Int. Cl.
*H04W 72/1263* (2023.01)
*H04L 1/18* (2023.01)
*H04W 92/18* (2009.01)

(52) U.S. Cl.
CPC ........... *H04W 72/1263* (2013.01); *H04L 1/18* (2013.01); *H04W 92/18* (2013.01)

(58) Field of Classification Search
CPC ......... H04W 72/1263; H04W 72/0446; H04W 72/40; H04L 1/1861; H04L 1/1893; H04L 5/0044; H04L 5/0055; H04L 5/0094
See application file for complete search history.

(56) References Cited

U.S. PATENT DOCUMENTS

2020/0037343 A1\* 1/2020 He ................... H04W 28/0268
2021/0050953 A1\* 2/2021 Park ..................... H04B 7/0456
(Continued)

FOREIGN PATENT DOCUMENTS

WO 2020033089 A1 2/2020
WO WO-2022175894 A1 \* 8/2022

OTHER PUBLICATIONS

CATT: "Sidelink Physical Layer Structure in NR V2X", 3GPP TSG RAN WG1 Meeting #97, R1-1906314, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, 15 Pages, XP051708349, May 4, 2019, XP051727764, Section 2, 3.2, 5.

(Continued)

*Primary Examiner* — Chae S Lee
(74) *Attorney, Agent, or Firm* — QUALCOMM Incorporated

(57) ABSTRACT

Disclosed are techniques for wireless communication. In an aspect, a UE determines a sidelink resource configuration for a slot, wherein the sidelink resource configuration includes a first set of resources carrying a first PSSCH in a first mini-slot of the slot, a second set of resources carrying a second PSSCH in a second mini-slot of the slot, and a third set of resources carrying a PSFCH associated with one or more PSSCHs of one or more preceding slots. The UE may communicate data over at least a portion of the slot in accordance with the sidelink resource configuration. In some designs, a sidelink management device (e.g., the UE, (Continued)

another UE, or a network component) may transmit the sidelink resource configuration.

26 Claims, 23 Drawing Sheets

(56) References Cited

U.S. PATENT DOCUMENTS

2021/0306824 A1* 9/2021 Li .......................... H04W 4/40
2021/0314933 A1* 10/2021 Zhang ..................... H04W 4/30
2022/0110076 A1* 4/2022 Shimoda ........... H04W 72/0446
2022/0377764 A1* 11/2022 Choi .................... H04L 1/1816

OTHER PUBLICATIONS

International Search Report and Written Opinion—PCT/US2022/075558—ISA/EPO—dated Nov. 30, 2022.

* cited by examiner

SIDELINK RESOURCE CONFIGURATION FOR A SLOT WITH MULTIPLE MINI-SLOTS AND A FEEDBACK CHANNEL

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some designs, mini-slots in sidelink may be used to achieve more efficient resource utilization and latency reduction, to allow SL UE to transmit/receive multiple SL mini-slots in a SL slot, and to allow SL UE to start transmitting PSSCH as soon as possible. PSFCH symbols are used to ACK and/or NACK transmissions (e.g., PSSCH).

For a sidelink slot with multiple mini-slots, current standards do not specify how to transmit ACK/NACK for each respective mini-slot. For example, in the current standard, the PFSCH resource (RB location in frequency location and $m_0$ cyclic shift) is determined by the slot index of the PSSCH and subchannel of the PSSCH (as well as the IDs of the Tx UE and/or RX UE). However, in this case, all mini-slots in a slot have the same slot index. Consider a scenario where UE 1 transmits two mini-slots, as example, to UE 2. UE 2 receives mini-slot 1 correctly, but receives mini-slot 2 with error. In this case, both mini-slot transmissions occupy the same subchannels and are in the same slot. Hence, it may be difficult for UE 2 to ACK mini-slot 1 while at the same time NACKing mini-slot 2, because both mini-slots would be mapped to the same PSFCH resource under current standard.

Aspects of the disclosure are thereby directed to sidelink resource configuration for a slot, whereby the resource configuration includes multiple mini-slots (or PSSCHs) as well as a PSFCH (or PSFCH block). The PSFCH block is associated with (e.g., configured to ACK/NACK) mini-slots (or PSSCHs) of one or more preceding slots. Such aspects may provide various technical advantages, such as leveraging mini-slots in sidelink communications (rather than just Uu communications), which may decrease communication latency, improve communication efficiency (e.g., in case of smaller payloads that need not occupy an entire sidelink slot), and so on.

In an aspect, a method of operating a user equipment (UE) includes determining a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and communicating data over at least a portion of the slot in accordance with the sidelink resource configuration.

In an aspect, a method of operating a sidelink management device includes determining a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and transmitting the sidelink resource configuration to one or more user equipments (UEs) associated with communication of the first PSSCH, the second PSSCH, the PSFCH, or a combination thereof.

In an aspect, a user equipment (UE) includes a memory; at least one transceiver; and at least one processor communicatively coupled to the memory and the at least one transceiver, the at least one processor configured to: determine a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and communicate, via the at least one transceiver, data over at least a portion of the slot in accordance with the sidelink resource configuration.

In an aspect, a sidelink management device includes a memory; at least one transceiver; and at least one processor communicatively coupled to the memory and the at least one transceiver, the at least one processor configured to: determine a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and transmit, via the at least one transceiver, the sidelink resource configuration to one or more user equipments (UEs) associated with communication of the first PSSCH, the second PSSCH, the PSFCH, or a combination thereof.

In an aspect, a user equipment (UE) includes means for determining a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and means for communicating data over at least a portion of the slot in accordance with the sidelink resource configuration.

In an aspect, a sidelink management device includes means for determining a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and means for transmitting the sidelink resource configuration to one or more user equipments (UEs) associated with communication of the first PSSCH, the second PSSCH, the PSFCH, or a combination thereof.

In an aspect, a non-transitory computer-readable medium storing computer-executable instructions that, when executed by a user equipment (UE), cause the UE to: determine a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and communicate data over at least a portion of the slot in accordance with the sidelink resource configuration.

In an aspect, a non-transitory computer-readable medium storing computer-executable instructions that, when executed by a sidelink management device, cause the sidelink management device to: determine a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and transmit the sidelink resource configuration to one or more user equipments (UEs) associated with communication of the first PSSCH, the second PSSCH, the PSFCH, or a combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
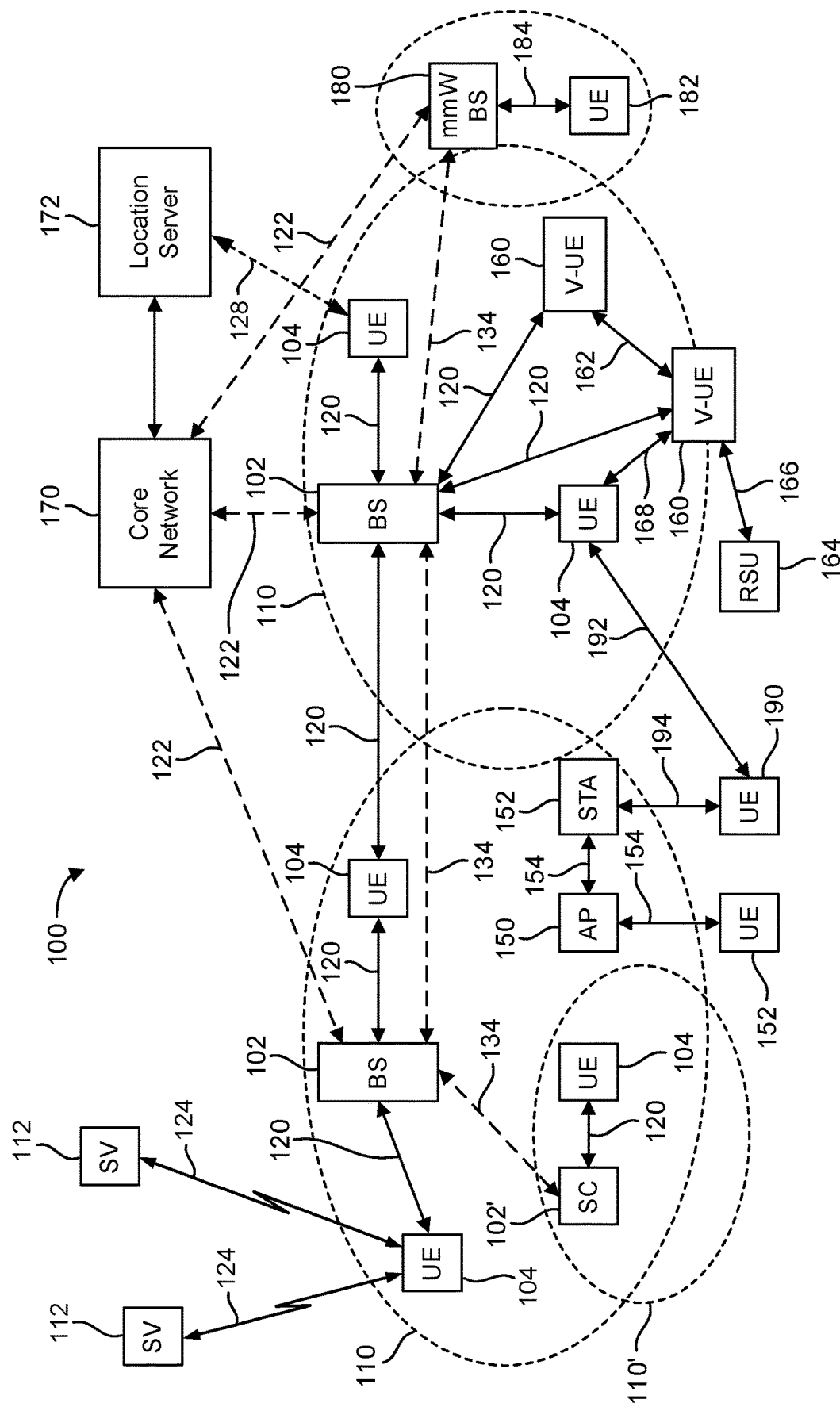
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs)

152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-MI) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
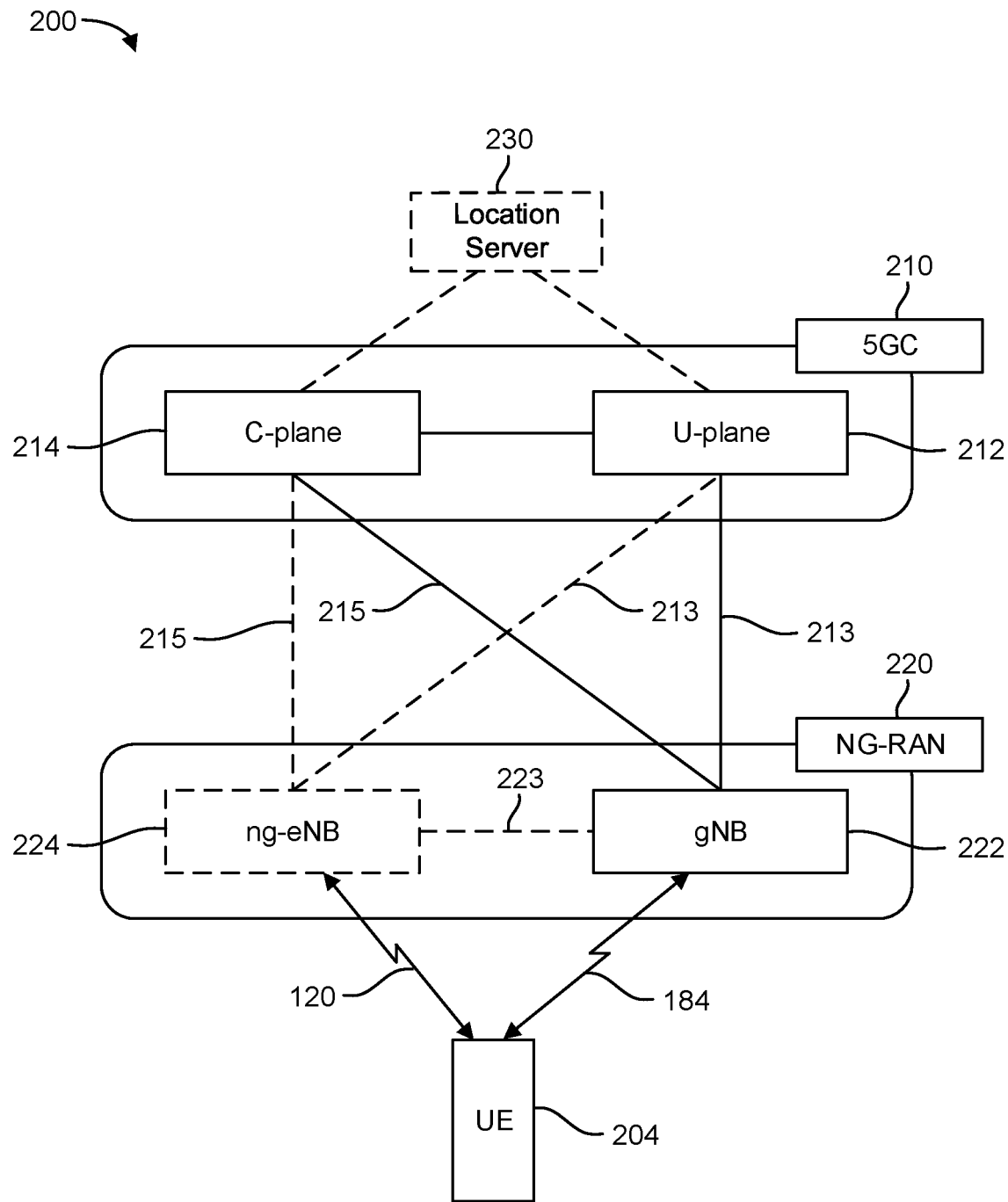
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
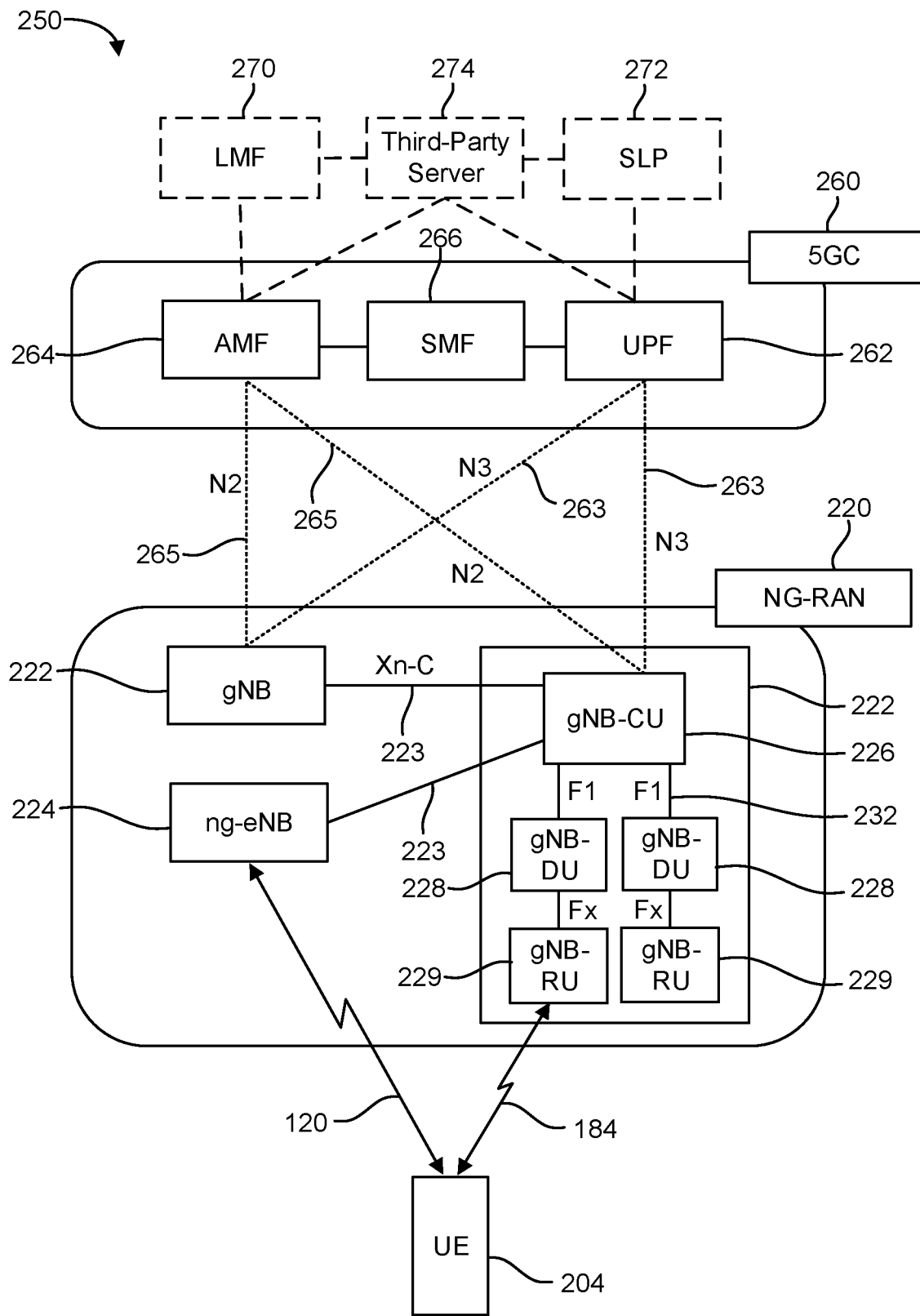

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
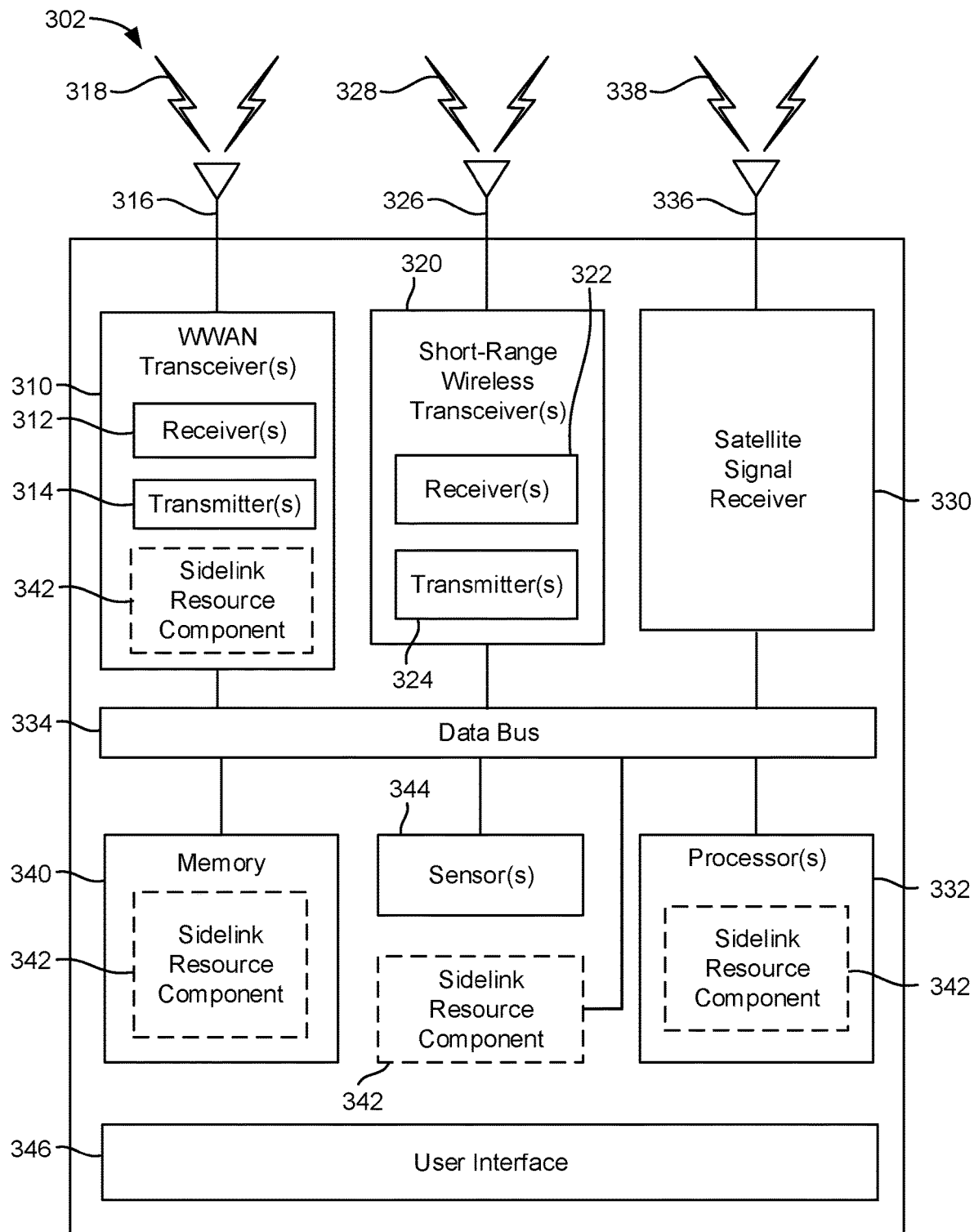
FIGS. 3A, 3B, and 3C are simplified block diagrams of several sample aspects of components that may be employed in a user equipment (UE), a base station, and a network entity, respectively, and configured to support communications as taught herein.
Figure 3B:
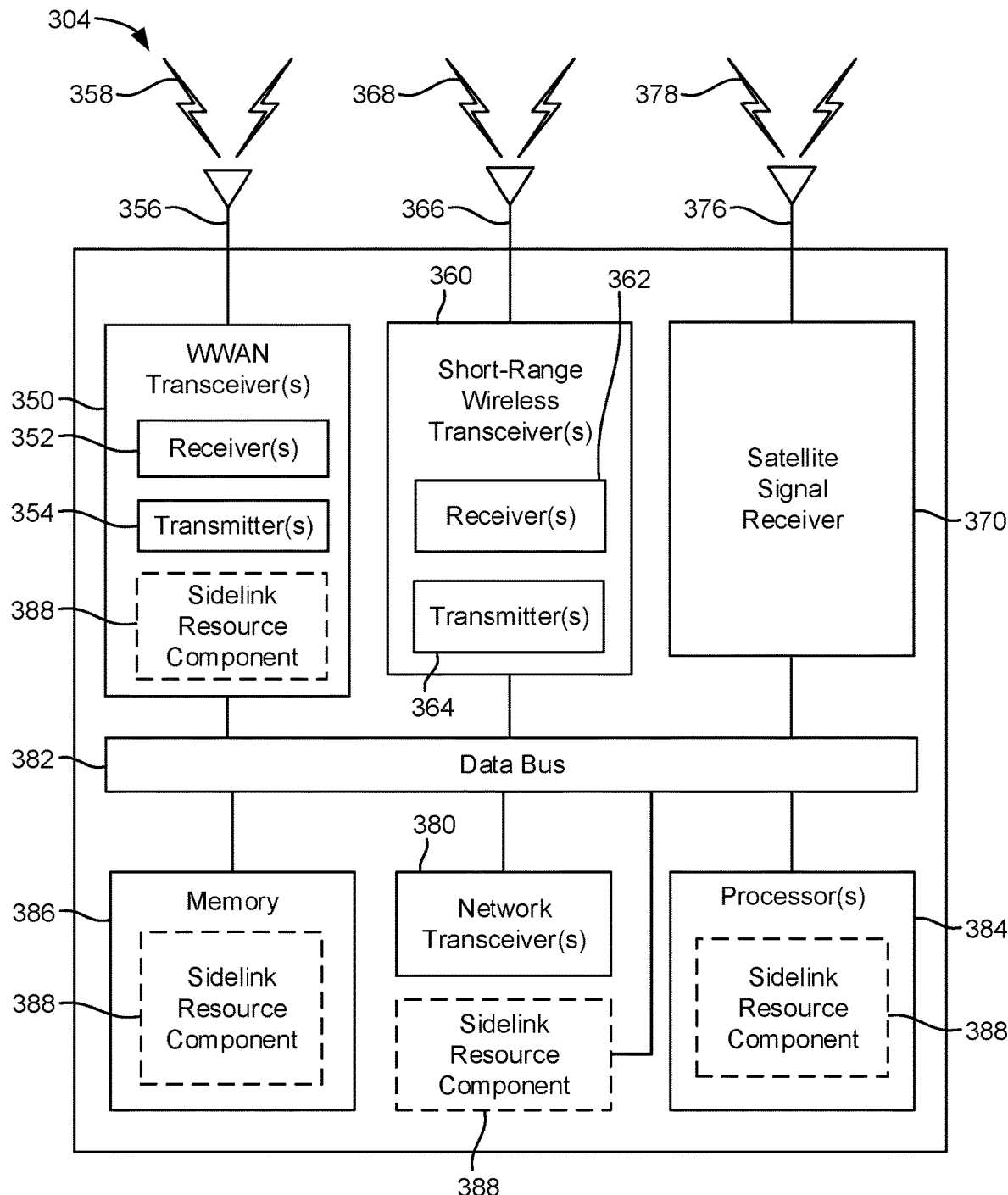
Figure 3C:
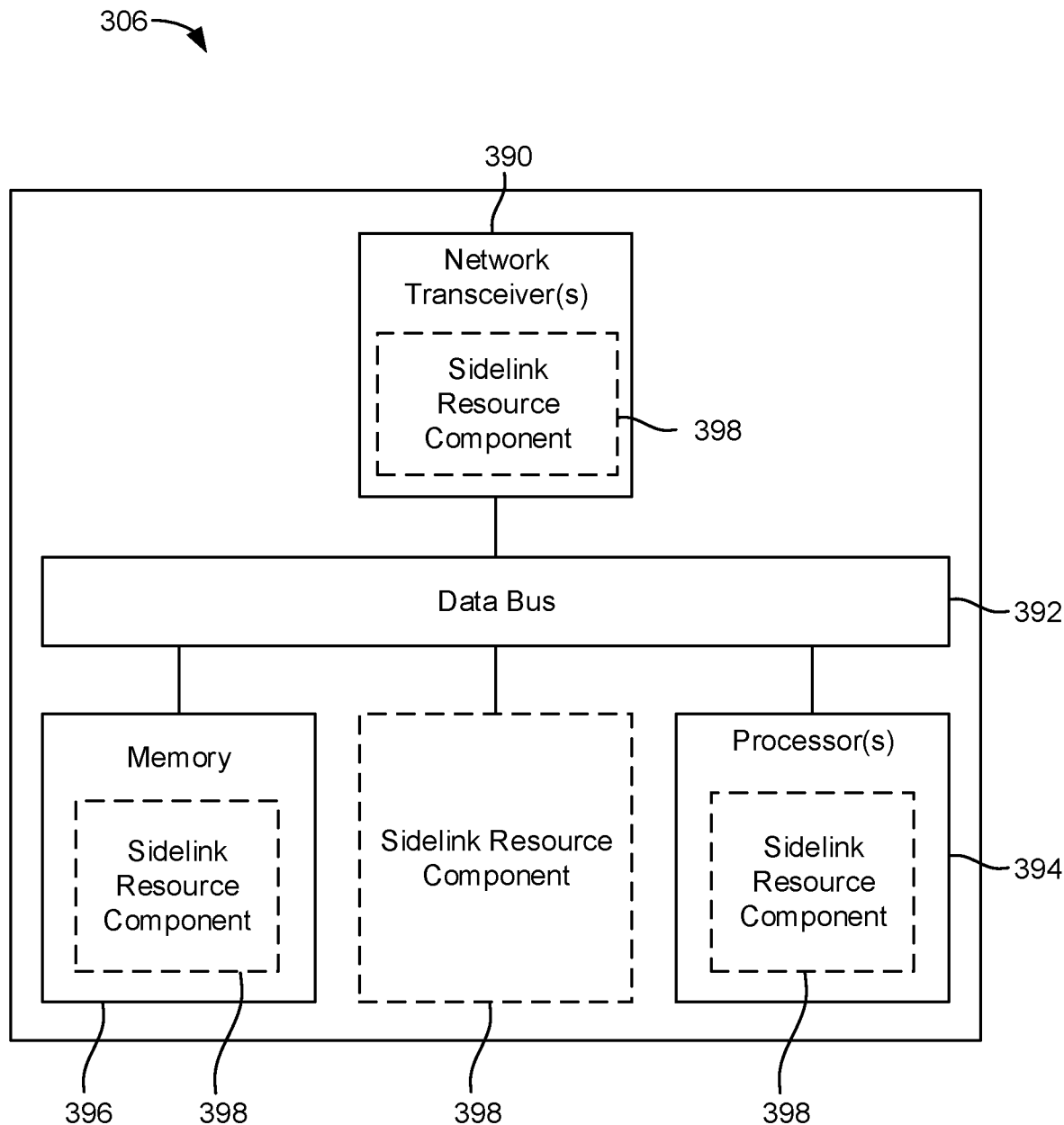

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sidelink resource component 342, 388, and 398, respectively. The sidelink resource component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sidelink resource component 342, 388, and 398 may be external to the processors 332, 384, and 394 (e.g., part of a modem processing system, integrated with another processing system, etc.). Alternatively, the sidelink resource component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sidelink resource component 342, which may be, for example, part of the one or more WWAN transceivers 310, the memory 340, the one or more processors 332, or any combination thereof, or may be a standalone component. FIG. 3B illustrates possible locations of the sidelink resource component 388, which may be, for example, part of the one or more WWAN transceivers 350, the memory 386, the one or more processors 384, or any combination thereof, or may be a standalone component. FIG. 3C illustrates possible locations of the sidelink resource component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sidelink resource component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
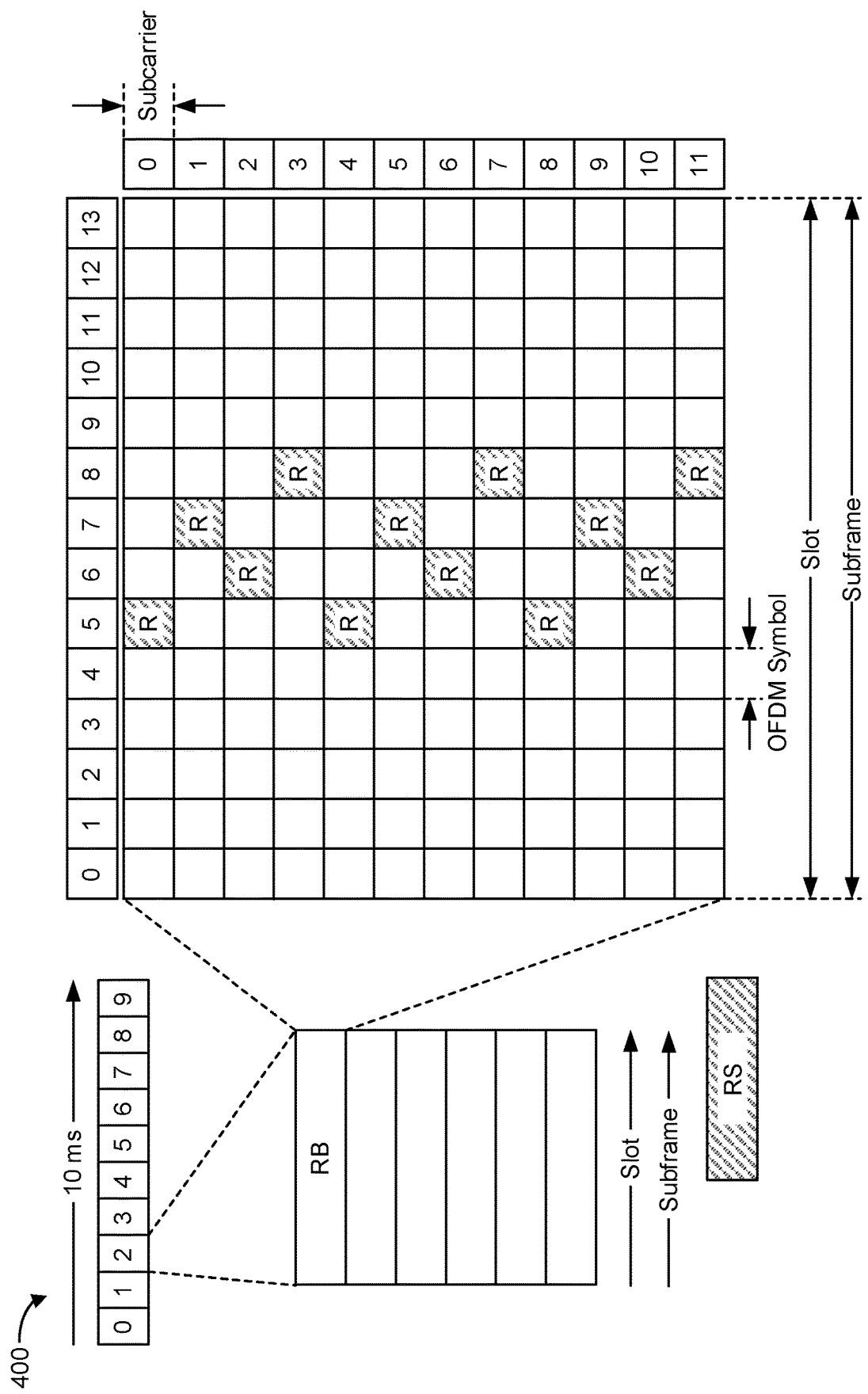
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS (µ=0), there is one slot per subframe, 10 slots per frame, the slot duration is 1 millisecond (ms), the symbol duration is 66.7 microseconds (µs), and the maximum nominal system bandwidth (in MHz) with a 4K FFT size is 50. For 30 kHz SCS (µ=1), there are two slots per subframe, 20 slots per frame, the slot duration is 0.5 ms, the symbol duration is 33.3 µs, and the maximum nominal system bandwidth (in MHz) with a 4K FFT size is 100. For 60 kHz SCS (µ=2), there are four slots per subframe, 40 slots per frame, the slot duration is 0.25 ms, the symbol duration is 16.7 µs, and the maximum nominal system bandwidth (in MHz) with a 4K FFT size is 200. For 120 kHz SCS (µ=3), there are eight slots per subframe, 80 slots per frame, the slot duration is 0.125 ms, the symbol duration is 8.33 µs, and the maximum nominal system bandwidth (in MHz) with a 4K FFT size is 400. For 240 kHz SCS (µ=4), there are 16 slots per subframe, 160 slots per frame, the slot duration is 0.0625 ms, the symbol duration is 4.17 µs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
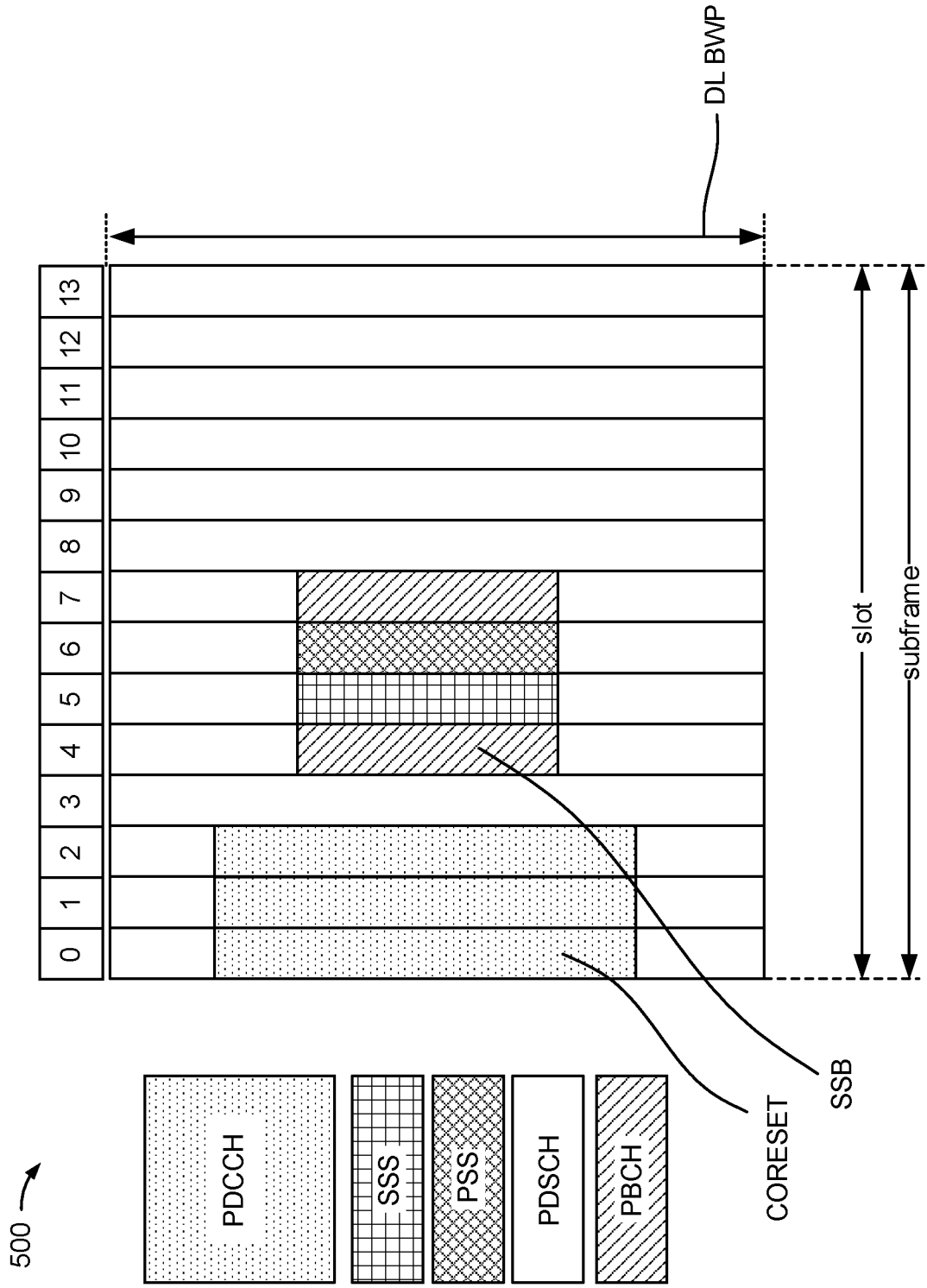
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 6:
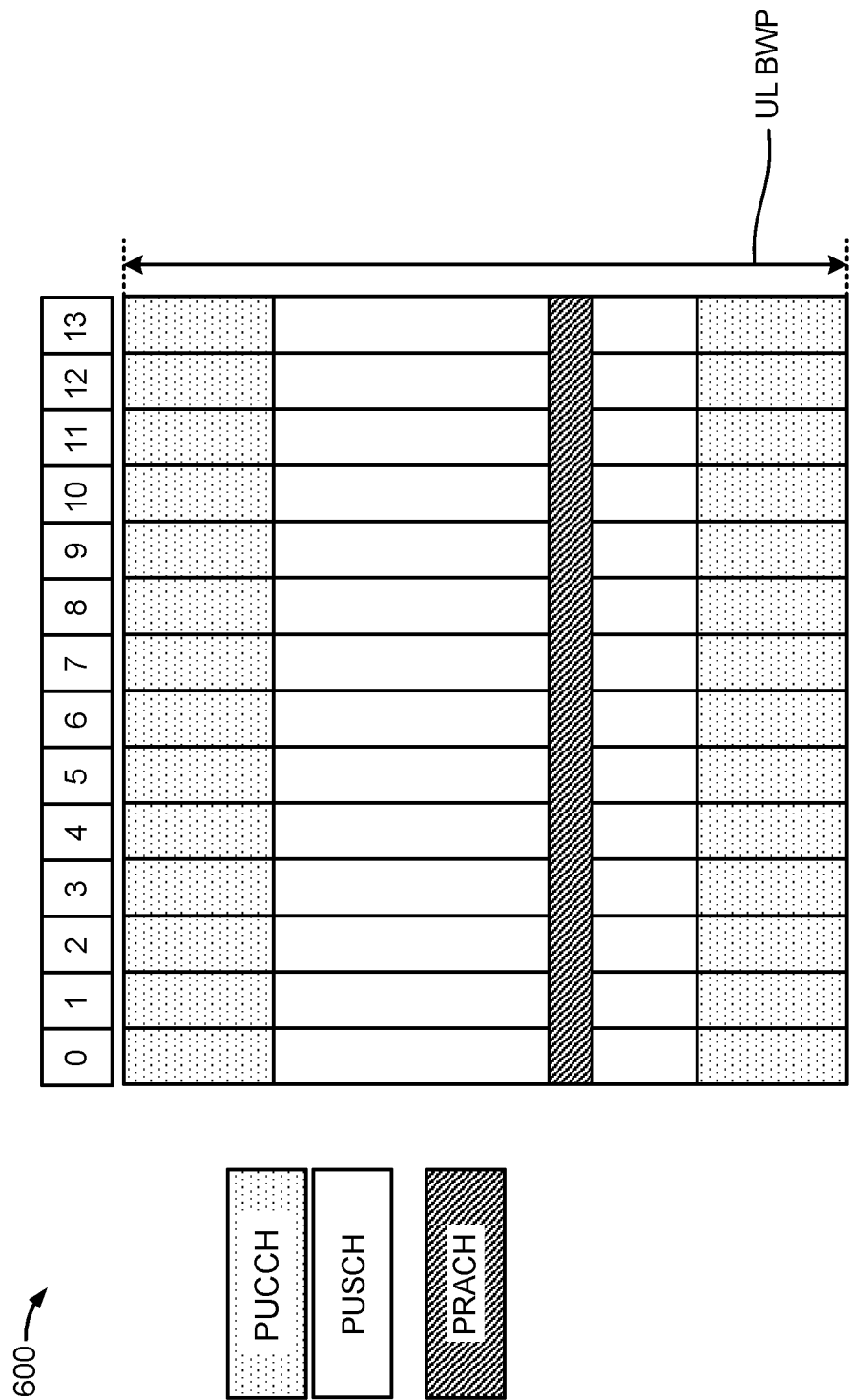
FIG. 6 is a diagram illustrating various uplink channels within an example uplink slot, according to aspects of the disclosure.

FIG. 6 is a diagram 600 illustrating various uplink channels within an example uplink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink can be (pre)configured to occupy fewer than the 14 symbols of a slot.

Sidelink resources are configured at the RRC layer. The RRC configuration can be by pre-configuration (e.g., pre-loaded on the UE) or configuration (e.g., from a serving base station).

Figure 7:
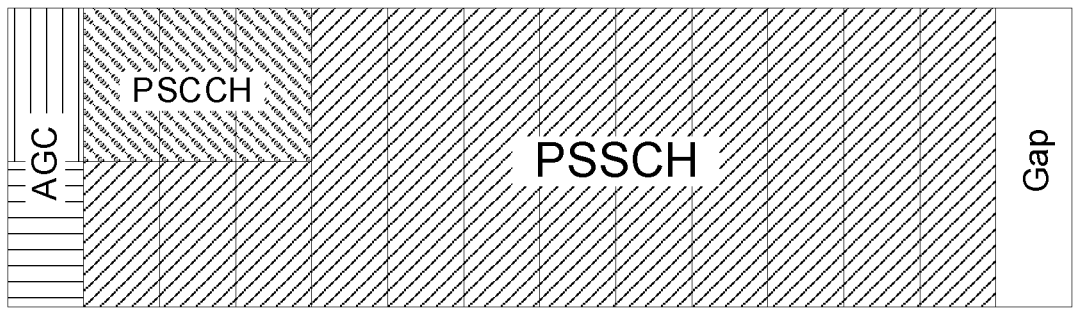
FIG. 7 is a diagram of an example slot structure without feedback resources, according to aspects of the disclosure.

NR sidelinks support HARQ retransmission. FIG. 7 is a diagram 700 of an example slot structure without feedback resources, according to aspects of the disclosure. In the example of FIG. 7, time is represented horizontally and frequency is represented vertically. In the time domain, the length of each block is one OFDM symbol, and the 14 symbols make up a slot. In the frequency domain, the height of each block is one or more sub-channels. Currently, the (pre)configured sub-channel size can be selected from the set of $\{10, 15, 20, 25, 50, 75, 100\}$ PRBs.

For a sidelink slot, the first symbol is a repetition of the preceding symbol and is used for automatic gain control (AGC) setting. This is illustrated in FIG. 7 by the vertical and horizontal hashing. As shown in FIG. 7, for sidelink, the physical sidelink control channel (PSCCH) and the physical sidelink shared channel (PSSCH) are transmitted in the same slot. Similar to the physical downlink control channel (PDCCH), the PSCCH carries control information about sidelink resource allocation and descriptions about sidelink data transmitted to the UE. Likewise, similar to the physical downlink shared channel (PDSCH), the PSSCH carries user date for the UE. In the example of FIG. 7, the PSCCH occupies half the bandwidth of the sub-channel and only three symbols. Finally, a gap symbol is present after the PSSCH.

Figure 8:
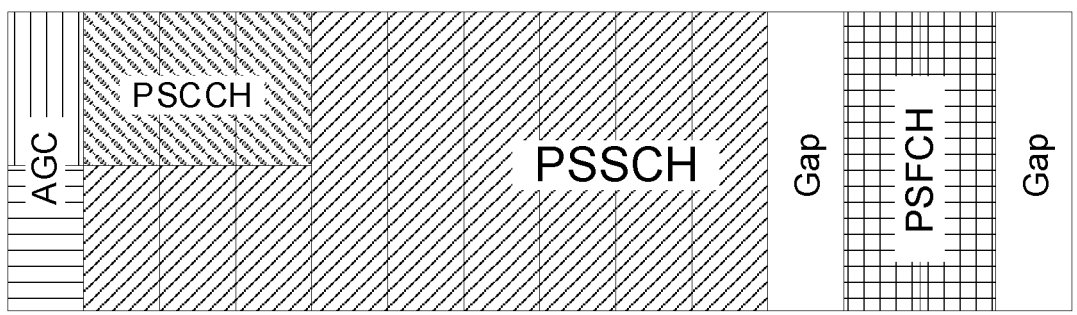
FIG. 8 is a diagram of an example slot structure with feedback resources, according to aspects of the disclosure.

FIG. 8 is a diagram 800 of an example slot structure with feedback resources, according to aspects of the disclosure. In the example of FIG. 8, time is represented horizontally and frequency is represented vertically. In the time domain, the length of each block is one OFDM symbol, and the 14 symbols make up a slot. In the frequency domain, the height of each block is one or more sub-channels.

The slot structure illustrated in FIG. 8 is similar to the slot structure illustrated in FIG. 7, except that the slot structure illustrated in FIG. 8 includes feedback resources. Specifically, two symbols at the end of the slot have been dedicated to the physical sidelink feedback channel (PSFCH). The first PSFCH symbol is a repetition of the second PSFCH symbol for AGC setting. In addition to the gap symbol after the PSSCH, there is a gap symbol after the two PSFCH symbols. Currently, resources for the PSFCH can be configured with a periodicity selected from the set of $\{0, 1, 2, 4\}$ slots.

The PSCCH carries sidelink control information (SCI). First stage control (referred to as "SCI-1") is transmitted on the PSCCH and contains information for resource allocation and decoding second stage control (referred to as "SCI-2"). The second stage control is transmitted on the PSSCH and contains information for decoding the data that will be transmitted on the shared channel (SCH) of the sidelink. The first stage control information is decodable by all UEs, whereas the second stage control information may include formats that are only decodable by certain UEs. This ensures that new features can be introduced in the second stage control while maintaining resource reservation backward compatibility in the first stage control.

In Uu (e.g., UL or DL communications between UE and gNB), mini-slots can be used to facilitate latency reduction and/or for transmission of small amount of data (more efficient resource utilization). For example, in some designs, a mini-slot can be implemented between different pairs of devices. Assuming a slot with 14 total OFDM symbols, in some designs, a mini-slot may occupy 2, 4 or 7 OFDM symbols. In some designs, UE-specific search space is configured such that a PDCCH can be received from the gNB anywhere in a slot, and thus allows a mini-slot anywhere in a slot. There is currently no formal of mini-slot in 3GPP standards.

A slot is marked for SL if the slot contains OFDM symbols that can be used for SL communication. Within a SL slot, sl-StartSymbol-r16 is the symbol index of the first symbol of sl-LengthSymbols-r16 consecutive symbols configured for sidelink communication. A $1^{st}$ symbol for SL communication is the AGC symbol, and starting from $2^{nd}$ SL symbol, PSSCH can be 5 to 12 symbols long. PSCCH is FDMed with PSSCH in symbols starting from $2^{nd}$ SL symbol, and PSCCH is either 2 or 3 symbols long. The remaining symbols in a slot are either gap symbol, PSFCH (2 symbols), or DL/UL.

Figure 9:
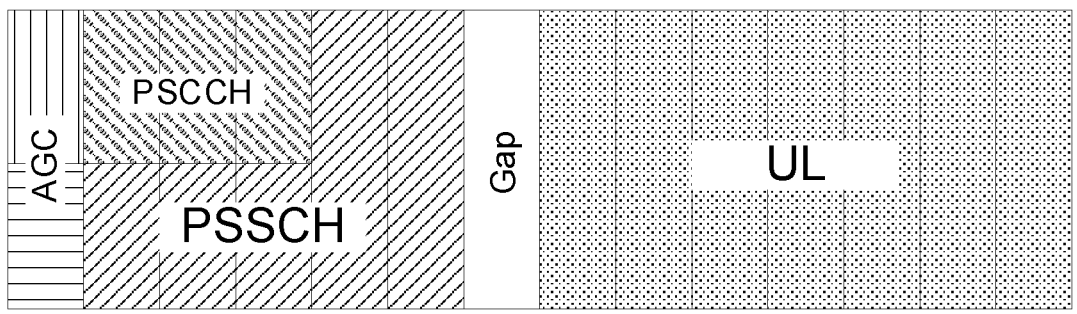
FIG. 9 illustrates a diagram of an example slot structure with resources allocated to PSSCH and UL, according to aspects of the disclosure.

FIG. 9 illustrates a diagram 900 of an example slot structure with resources allocated to PSSCH and UL, according to aspects of the disclosure. In the example of FIG. 9, time is represented horizontally and frequency is represented vertically. In the time domain, the length of each block is one OFDM symbol, and the 14 symbols make up a slot. In the frequency domain, the height of each block is one sub-channel. In FIG. 9, a 5-symbol PSSCH is separated from a 7-symbol UL block by a gap. In some designs, the gap allows for the UE to switch beams and/or switch from Rx mode to Tx mode. To facilitate the slot structure of FIG. 9, sl-StartSymbol-r16=0 and sl-LengthSymbols-r16=7. Generally, the particular slot structure may be chosen based on how much data needs to be transmitted to/from UE(s), a latency requirement of certain data transmissions, and so on.

Figure 10:
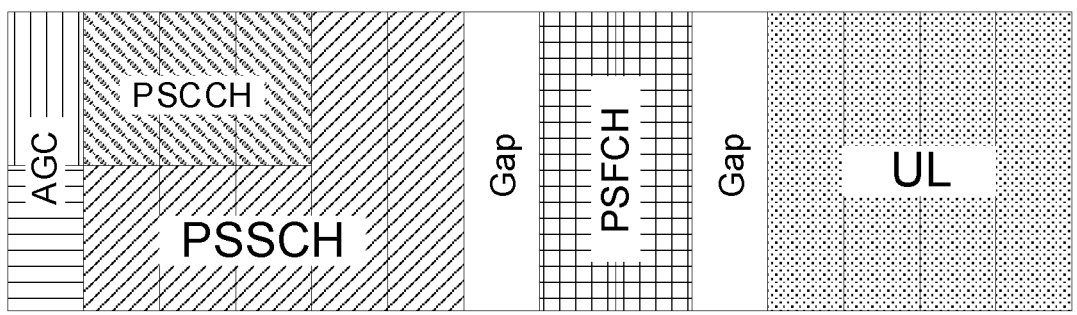
FIG. 10 illustrates a diagram of an example slot structure with resources allocated to PSSCH and UL with feedback, according to aspects of the disclosure.

FIG. 10 illustrates a diagram 1000 of an example slot structure with resources allocated to PSSCH and UL with feedback, according to aspects of the disclosure. In the example of FIG. 10, time is represented horizontally and frequency is represented vertically. In the time domain, the length of each block is one OFDM symbol, and the 14 symbols make up a slot. In the frequency domain, the height of each block is one sub-channel. In FIG. 10, a 5-symbol PSSCH is separated from 2-symbol PSFCH by a 1-symbol gap, and the 2-sybmol PSFCH is in turn separated from a 5-symbol UL block by a 1-symbol gap. To facilitate the slot structure of FIG. 9, sl-StartSymbol-r16=0 and sl-LengthSymbols-r16=10. Generally, the particular slot structure may be chosen based on how much data needs to be transmitted to/from UE(s), a latency requirement of certain data transmissions, and so on.

In some designs, only one SL BWP configured, and multiple resource pools (up to 16) in SL BWP can be configured. In some designs, sl-StartSymbol-r16 and sl-LengthSymbols-r16 are configured per SL BWP.

In some designs, mini-slots in SL may be used to achieve more efficient resource utilization and latency reduction, to allow SL UE to transmit/receive multiple SL mini-slots in a SL slot, and to allow SL UE to start transmitting PSSCH as soon as possible, even if that means the UE transmits starting not in sl-StartSymbol-r16 (e.g., mini-slot can start later in slot rather than directly after an initial AGC symbol).

Figure 11:
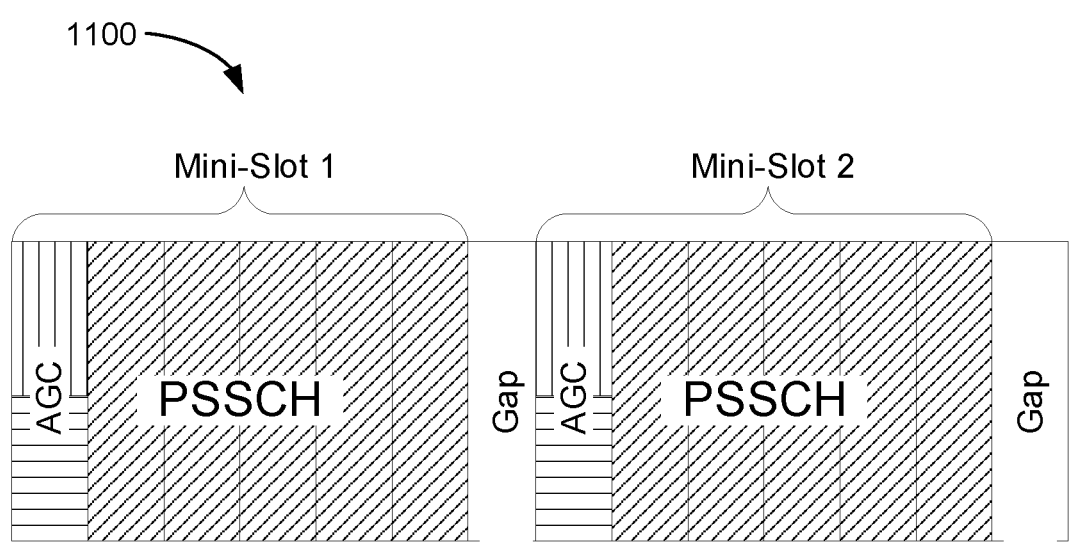
FIG. 11 illustrates a slot format with mini-slots in accordance with aspects of the disclosure.

FIG. 11 illustrates a slot format 1100 in accordance with aspects of the disclosure. In FIG. 11, the slot format 1100 includes two mini-slots. In some designs, each SL resource pool may be associated with a set of sl-StartSymbol-r16s that define in which symbol a SL mini-slot may start in SL slot. Each sl-StartSymbol-r16 in the set may further be associated with a corresponding sl-LengthSymbols-r16s. In some designs, SL UE is configured to transmit/receive in one or more resource pools. Based on the resource pools the SL UE is configured for Tx/Rx, the SL UE knows in which symbols the UE should transmit/receive PSCCH and AGC symbols. As shown in FIG. 11, each mini-slot contains its own PSCCH/SCI. In some designs, SL UE may Tx/Rx starting from multiple possible symbols (sl-StartSymbols-r16s), and the duration of Tx/Rx may be one of multiple possible lengths (sl-LengthSymbols-r16s). While a configuration with two mini-slots is depicted in FIG. 11, other configurations may include three or more mini-slots in a respective slot.

In some designs, resource allocation in sidelink may be implemented via Mode 1, where gNB assigns Tx resources for sidelink communications through DCI 3_0. In other designs, resource allocation in sidelink may be implemented via Mode 2, where a transmitting UE autonomously decides resources for sidelink communications. In some designs, the receiving UE behavior is the same for both Modes 1 and 2. Mode 1 supports dynamic grants (DG), configured grants (CG) type 1, and CG type 2. In some designs, CG type 1 is activated via RRC signaling from gNB. DCI 3_0 is transmitted by gNB to allocation time and frequency resources and indicates transmission timing. In some designs, the modulation and coding scheme (MCS) MCS is up to UE within limit set by gNB. In Mode 2, the transmitting UE performs channel sensing by blindly decoding all PSCCH channels and finds out reserved resources by other sidelink transmissions. The transmitting UE reports available resources to upper layer and upper layer decides resource usage.

Figure 12:
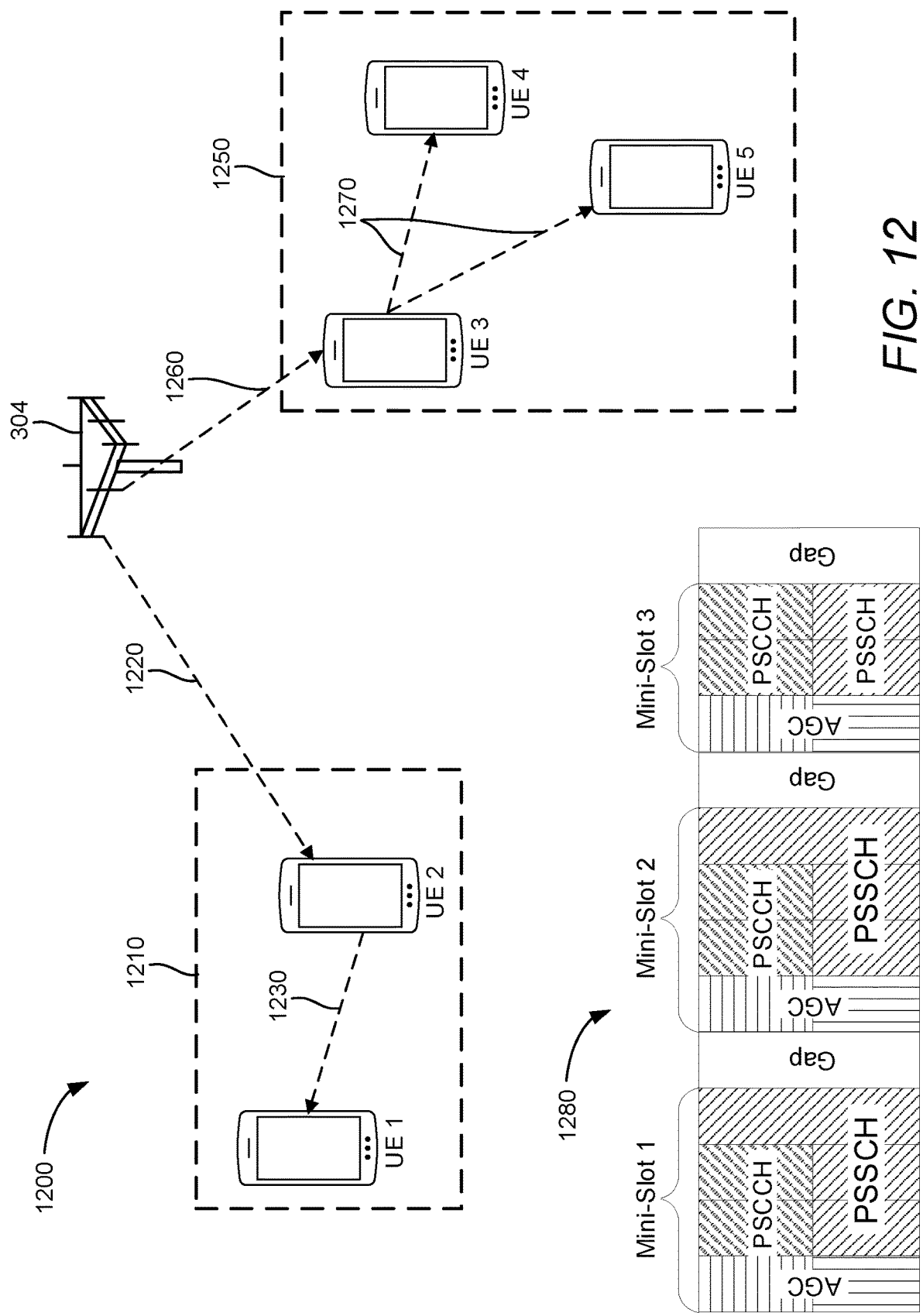
FIG. 12 illustrates a communication scheme in accordance with aspects of the disclosure.

FIG. 12 illustrates a communication scheme 1200 in accordance with aspects of the disclosure. In particular, the communication scheme 1200 is a Mode 1 communication scheme. Referring to FIG. 12, UEs 1 and 2 are grouped in association with a first sidelink resource pool 1210, and UEs 3, 4 and 5 are grouped in association with a second sidelink resource pool 1250. BS 304 transmits a sidelink transmission grant 1220 to UE 2, and UE 2 performs a sidelink transmission 1230 on a slot to UE 1 using resources from the first sidelink resource pool 1210. In an example, assume that a slot format for the sidelink transmission 1230 may correspond to the slot format 700 of FIG. 7 (i.e., no mini-slots). BS 304 further transmits a sidelink transmission grant 1260 to UE 3, and UE 3 performs a sidelink transmission 1270 on a first mini-slot of a slot to UE 4 using resources from the second sidelink resource pool 1250, and on a second mini-slot of the slot to UE 5 using resources from the second sidelink resource pool 1250. In an example, assume that a slot format for the sidelink transmission 1270 may correspond to a slot format 1280. For example, the slot format 1280 is arranged with three mini-slots, and the mini-slots used for the sidelink transmission 1270 to UEs 4 and 5 may correspond to two of these three mini-slots (e.g., third mini-slot may be used for some other communication).

Figure 13:
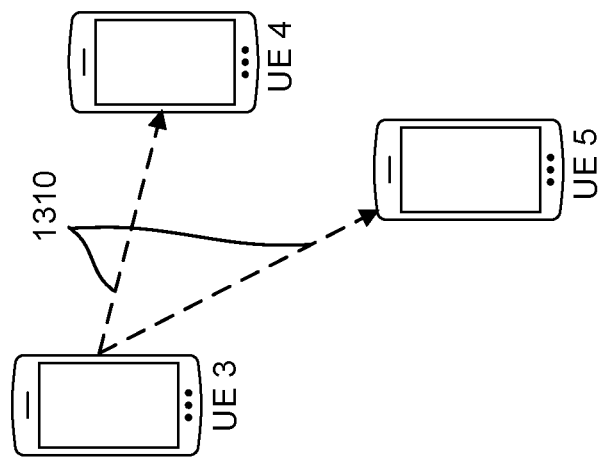
FIG. 13 illustrates a communication scheme in accordance with aspects of the disclosure.
Figure 13:
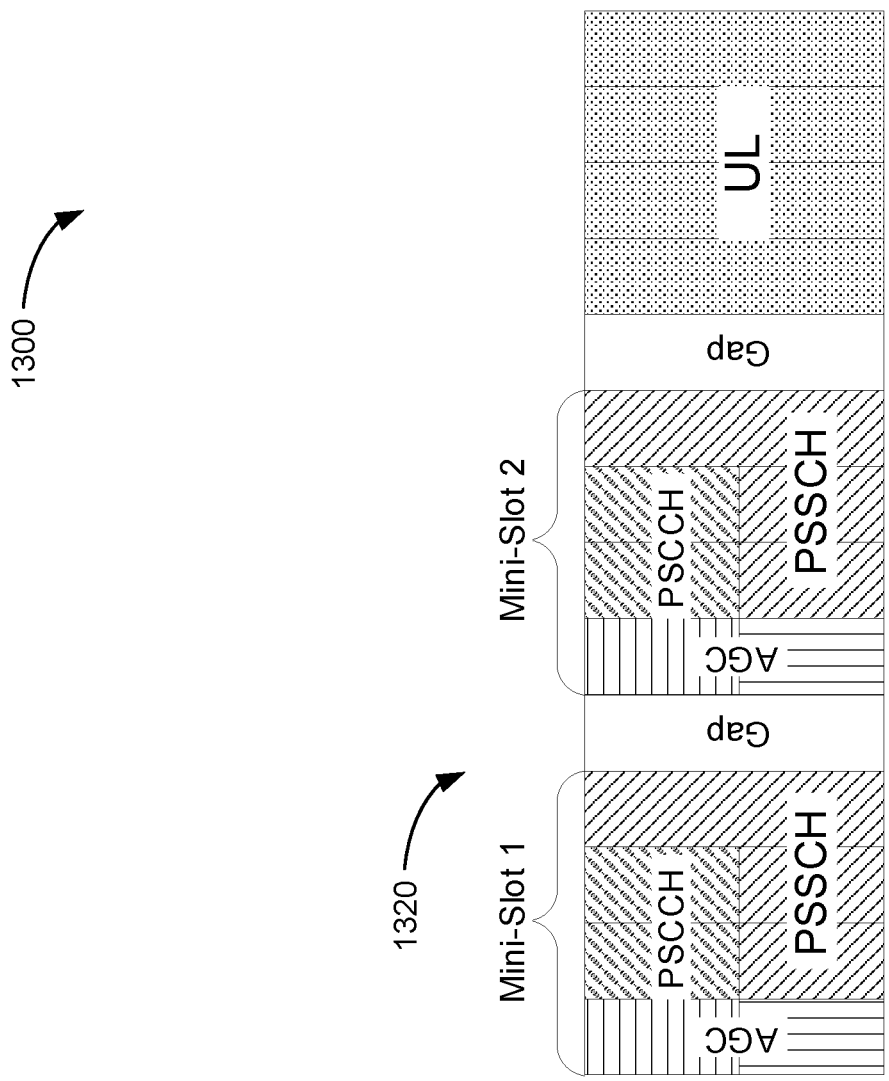

FIG. 13 illustrates a communication scheme 1300 in accordance with aspects of the disclosure. In particular, the communication scheme 1300 is a Mode 2 communication scheme. Referring to FIG. 13, assume that UEs 3, 4 and 5 are grouped in association with the same sidelink resource pool. In this case, UEs 3, 4 and 5 communication via Mode 2 sidelink without explicit grants from the network. UE 3 performs a sidelink transmission 1310 on a first mini-slot of a slot to UE 4 using resources from the sidelink resource pool, and on a second mini-slot of the slot to UE 5 using resources from the sidelink resource pool. In an example, assume that a slot format for the sidelink transmission 1310 may correspond to a slot format 1320. For example, the slot format 1320 is arranged with two sidelink mini-slots and a UL block, and the mini-slots used for the sidelink transmission 1310 to UEs 4 and 5 may correspond to these two mini-slots (e.g., UL block may be used for some other communication).

Figure 14:
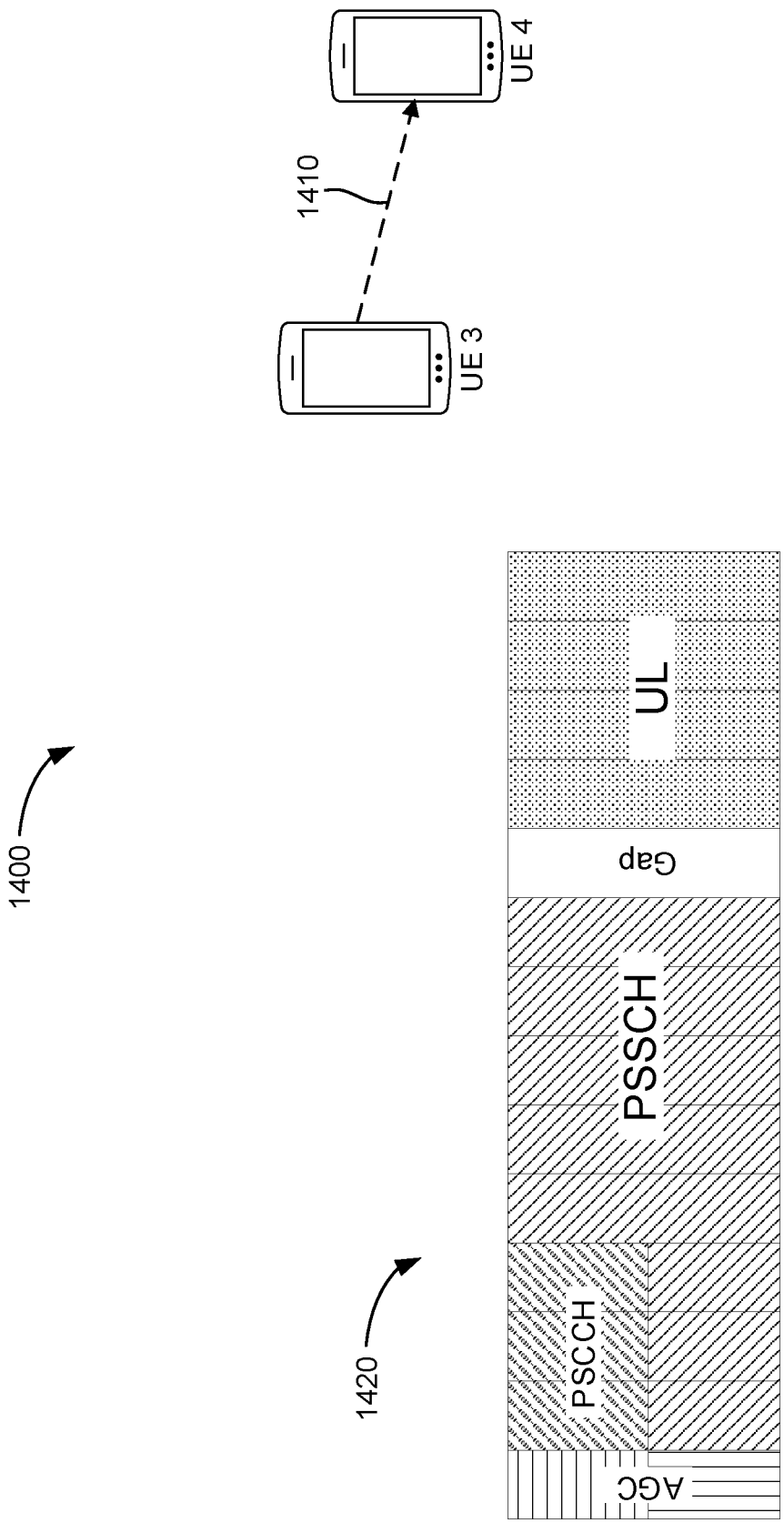
FIG. 14 illustrates a communication scheme in accordance with aspects of the disclosure.

FIG. 14 illustrates a communication scheme 1400 in accordance with aspects of the disclosure. In particular, the communication scheme 1400 is a Mode 2 communication scheme. Referring to FIG. 14, assume that UEs 3 and 4 are grouped in association with the same sidelink resource pool. In this case, UEs 3 and 4 communication via Mode 2 sidelink without explicit grants from the network. UE 3 performs a sidelink transmission 1410 on to UE 4 using resources from the sidelink resource pool. In an example, assume that a slot format for the sidelink transmission 1410 may correspond to a slot format 1420. For example, the slot format 1420 is arranged with a PSSCH block and a UL block (e.g., UL block may be used for some other communication).

PSFCH symbols are periodic with period given by sl-PSFCH-Period, a number of slots in a resource pool for a period of PSFCH transmission occasion resources. If the number is zero, PSFCH transmissions from the UE in the resource pool are disabled. There must be at least a number of slots, provided by sl-MinTimeGapPSFCH, of the resource pool between PSFCH transmission and the reception of the corresponding PSSCH. Generally, there are two modes of feedback (when enabled):

Option 1: Receiver UE transmits only NACK (e.g., useful in groupcast, to reduce overhead/interference), or Option 2: Receiver UE transmits ACK or NACK.

PUCCH Format 0 is used for PSFCH. In PUCCH Format 0, one RB carries HARQ-ACK information for a single PSSCH transmission. A cyclic shift offset distinguishes ACK from NACK (cyclic shift based on ACK/NACK). For example, cyclic shift offset=0 for NACK, and cyclic shift offset=6 for ACK In some designs, the number of initial cyclic shift pairs allowed for PSFCH is given by sl-NumMuxCS-Pair. For the initial cyclic shift (referred to as $m_0$), the allowed initial cyclic shift values are 0, 1, 2, 3, 4, 5. In some designs, initial cyclic shift ($m_0$) and the frequency domain location of the RB are determined by index of the corresponding PSSCH slot, physical ID of the Tx UE (option 1) or physical ID of the Tx UE and the ID of the Rx UE (option 2) using $(P_{ID}+M_{ID})$ mod $R_{PRB,CS}^{PSFCH}$ where $P_{ID}$ is physical ID of the Tx UE and MID is the ID of the Rx UE (use $M_{ID}=0$ for option 1). In some designs, $R_{PRB,CS}^{PSFCH}$ is based on sl-NumMuxCS-Pair, sl-NumSubchannel, sl-PSFCH-Period, sl-PSFCH-RB-Set, sl-PSFCH-CandidateResourceType, and either the number of subchannels or the starting subchannel index of the corresponding PSSCH. In some designs, sl-NumMuxCS-Pair (or $N_{CS}^{PSFCH}$) is determined as follows:

TABLE 1

Set of Cyclic Shift Pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

In some designs, a mapping of HARQ-ACK information bit values to a cyclic shift, from a cyclic shift pair, of a sequence for a PSFCH transmission when HARQ-ACK information includes ACK or NACK may be pre-defined (e.g., for HARQ-ACK value of 0 or NACK, sequence cyclic shift ($m_{cs}$)=0, and for HARQ-ACK value of 1 or ACK, sequence cyclic shift ($m_{cs}$)=6). In some designs, a mapping of HARQ-ACK information bit values to a cyclic shift, from a cyclic shift pair, of a sequence for a PSFCH transmission when HARQ-ACK information includes only NACK may be pre-defined (e.g., for HARQ-ACK value of 0 or NACK, sequence cyclic shift ($m_{cs}$)=0, and for HARQ-ACK value of 1 or ACK, sequence cyclic shift ($m_{cs}$)=N/A).

For a sidelink slot with multiple mini-slots, current standards do not specify how to transmit ACK/NACK for each respective mini-slot. For example, in the current standard, the PFSCH resource (RB location in frequency location and $m_0$ cyclic shift) is determined by the slot index of the PSSCH and subchannel of the PSSCH (as well as the IDs of the Tx UE and/or RX UE). However, in this case, all mini-slots in a slot have the same slot index. Consider a scenario where UE 1 transmits both mini-slots in FIG. 11, as example, to UE 2. UE 2 receives mini-slot 1 correctly, but receives mini-slot 2 with error. In this case, both mini-slot transmissions occupy the same subchannels and are in the same slot. Hence, it may be difficult for UE 2 to ACK mini-slot 1 while at the same time NACKing mini-slot 2, because both mini-slots would be mapped to the same PSFCH resource under current standard.

Aspects of the disclosure are thereby directed to sidelink resource configuration for a slot, whereby the resource configuration includes multiple mini-slots (or PSSCHs) as well as a PSFCH (or PSFCH block). The PSFCH block is associated with (e.g., configured to ACK/NACK) mini-slots (or PSSCHs) of one or more preceding slots. Such aspects may provide various technical advantages, such as leveraging mini-slots in sidelink communications (rather than just Uu communications), which may decrease communication latency, improve communication efficiency (e.g., in case of smaller payloads that need not occupy an entire sidelink slot), and so on.

Figure 15:
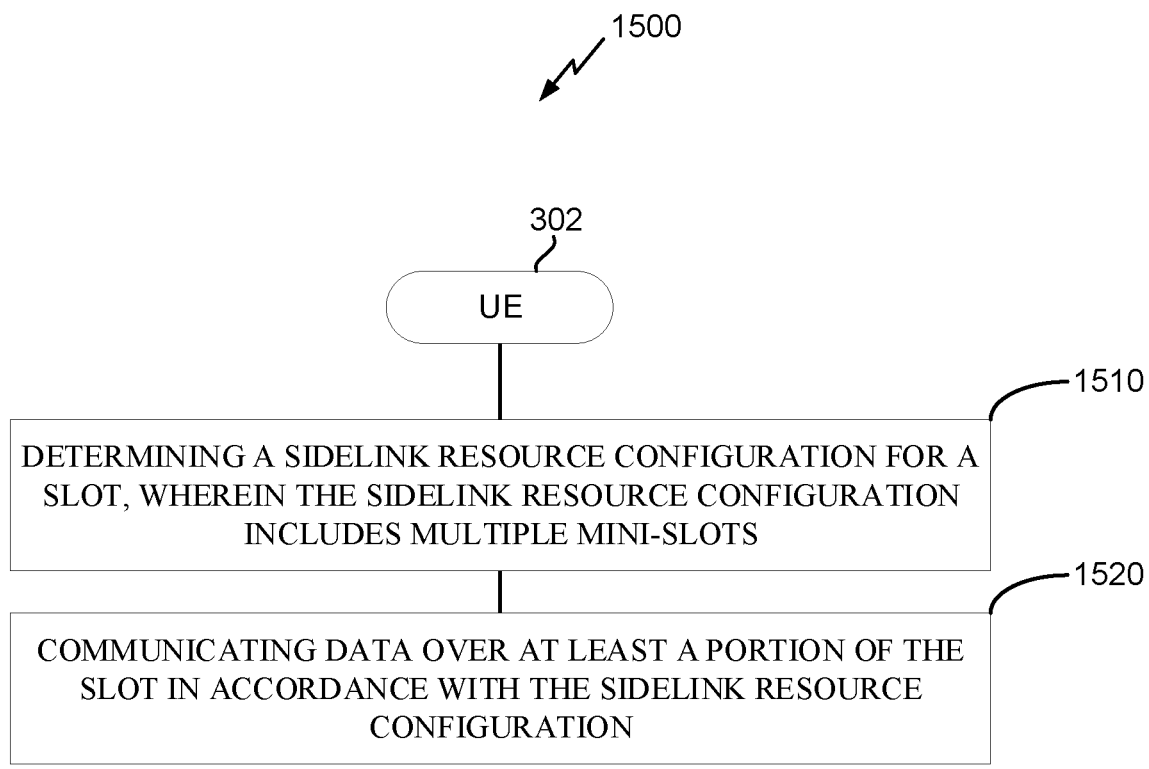
FIG. 15 illustrates an exemplary process of wireless communication, according to aspects of the disclosure.

FIG. 15 illustrates an exemplary process 1500 of wireless communication, according to aspects of the disclosure. In an aspect, the process 1500 may be performed by a UE, such as UE 302.

At 1510, UE 302 (e.g., processor(s) 332, receiver 312 or 322, sidelink resource component 342, etc.) determines a sidelink resource configuration for a slot. In some designs, the sidelink resource configuration includes a first set of resources carrying a first physical sidelink shared channel (PSSCH) in a first mini-slot of the slot. In some designs, the sidelink resource configuration includes a second set of resources carrying a second PSSCH in a second mini-slot of the slot. In some designs, the lengths of the first and second mini-slots are configurable and need not be the same. In some designs, one or more additional mini-slots may also be associated with the sidelink resource configuration (e.g., not limited to two mini-slots). In some designs, the sidelink resource configuration further includes a third set of resources carrying a physical feedback shared channel (PSFCH) associated with one or more PSSCHs of one or more preceding slots. For example, the third set of resources may comprise two OFDM symbols in some designs (e.g., with the RBs of each of the two OFDM symbols being repetitions). In some designs, the sidelink resource configuration may be determined in various ways (e.g., received from an external entity such as a network component for Mode 1 sidelink operation or another UE for Mode 2 operation, or independently determined/selected at UE 302 itself for Mode 2 operation, etc.).

At 1520, UE 302 (e.g., receiver 312 or 322, transmitter 314 or 324, etc.) communicates data over at least a portion (e.g., some or all) of the slot in accordance with the sidelink resource configuration. In some designs, UE 302 may be involved with communication of data over the first PSSCH, the second PSSCH, the PSFCH, or any combination thereof. Hence, the communication may include transmission of data on the first PSSCH, or the communication comprises reception of data on the first PSSCH, or the communication may include transmission of data on the PSFCH, or the communication may include reception of data on the PSFCH, or the communication may include transmission of data on the second PSSCH, or the communication may include reception of data on the second PSSCH, or a combination thereof.

Figure 16:
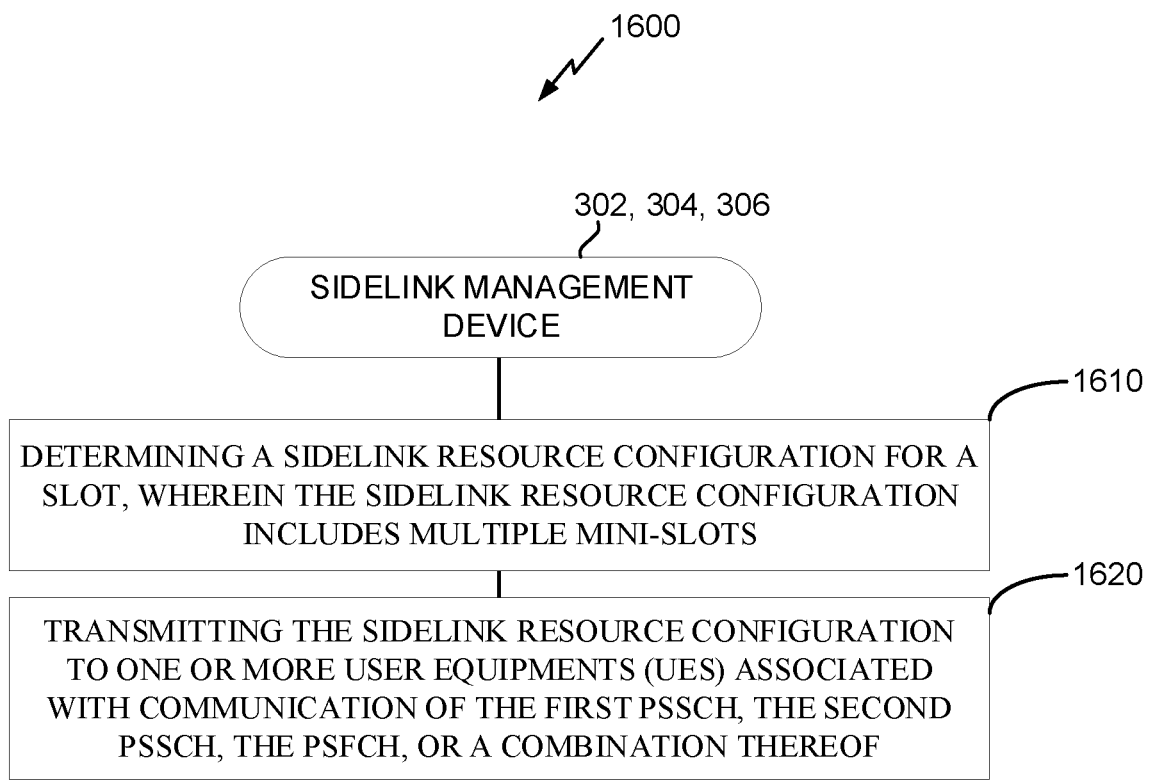
FIG. 16 illustrates an exemplary process of wireless communication, according to aspects of the disclosure.

FIG. 16 illustrates an exemplary process 1600 of wireless communication, according to aspects of the disclosure. In an aspect, the process 1600 may be performed by a sidelink management device, such as UE 302 (e.g., for Mode 2 sidelink operation), BS 304 (e.g., for Mode 1 sidelink operation) or network entity 306 (e.g., for Mode 1 sidelink operation).

At 1610, the sidelink management device (e.g., processor(s) 332 or 384 or 394, sidelink resource component 342 or 388 or 398, etc.) determines a sidelink resource configuration for a slot. In some designs, the sidelink resource configuration includes a first set of resources carrying a first physical sidelink shared channel (PSSCH) in a first mini-slot of the slot. In some designs, the sidelink resource configuration includes a second set of resources carrying a second PSSCH in a second mini-slot of the slot. In some designs, the lengths of the first and second mini-slots are configurable and need not be the same. In some designs, one or more additional mini-slots may also be associated with the sidelink resource configuration (e.g., not limited to two mini-slots). In some designs, the sidelink resource configuration further includes a third set of resources carrying a physical feedback shared channel (PSFCH) associated with one or more PSSCHs of one or more preceding slots. For example, the third set of resources may comprise two OFDM symbols in some designs (e.g., with the RBs of each of the two OFDM symbols being repetitions).

At 1620, the sidelink management device (e.g., transmitter 314 or 324 or 354 or 364, network transceiver(s) 380 or 390, etc.) transmits the sidelink resource configuration to one or more user equipments (UEs) associated with communication of the first PSSCH, the second PSSCH, the PSFCH, or a combination thereof. In case of Mode 1 sidelink operation, the transmission of 1620 may correspond to a network component (e.g., BS 304 or network entity 306) transmitting the sidelink resource configuration to UE(s) associated with the communication of data over the first PSSCH, the second PSSCH and/or the PSFCH. In case of Mode 2 sidelink operation, the transmission of 1620 may correspond a sidelink transmission to one or more other UEs associated with the communication of data over the first PSSCH, the second PSSCH and/or the PSFCH.

Referring to FIGS. 15-16, in some designs, the PSFCH provides a positive acknowledgment (ACK) or a negative acknowledgment (NACK) to each of a corresponding first PSSCH and a corresponding second PSSCH, the corresponding first PSSCH and the corresponding second PSSCH corresponding to the one or more PSSCHs of the one or more preceding slots. In other designs, the PSFCH provides NACKs only (e.g., PSSCHs that are successfully received are not ACKed, and only PSSCHs that are unsuccessfully received are NACKed).

Referring to FIGS. 15-16, in some designs, the PSFCH comprises a set of symbols, and each symbol of the set of symbols includes a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots. As noted above, the set of symbols may include multiple PSFCH symbol repetitions (e.g., two OFDM symbol repetitions). In some designs, each PSFCH resource among the first set of PSFCH resources and the second set of PSFCH resources comprises a physical resource block (PRB) index and an initial cyclic shift ($m_0$). The cyclic shift offset may be denoted as $m_{cs}$ and the initial cyclic shift may be denoted as $m_0$, whereby $m_0+m_{cs}$=total cyclic shift. In some designs, cyclic shift offset ($m_{cs}$) is based on the information content of PSFCH (e.g., 0 for NACK and 6 for ACK in option 2, or 0 for NACK in option 1). In other designs, the cyclic shift offset ($m_{cs}$) itself may be based on an index associated with a corresponding mini-slot PSSCH.

Referring to FIGS. 15-16, in some designs, the first set of PSFCH resources is determined based at least in part upon a first index associated with the first mini-slot, and the second set of PSFCH resources is determined based at least in part upon a second index associated with the second mini-slot. In some designs, the first index corresponds to a first mini-slot order index and the second index corresponds to a second mini-slot order index. In this case, the relative order (or position) of mini-slots within a slot may determine the RB(s) for ACKing and/or NACKing the corresponding PSSCH(s) within the PSFCH block. For example, a first mini-slot in the slot may be associated with PRB index 1, a second mini-slot in the slot may be associated with PRB index 2, and so on.

Referring to FIGS. 15-16, in some designs, the first index corresponds to a first symbol index and the second index corresponds to a second symbol index. In some designs, the first symbol index corresponds to the index of the initial symbol of the first mini-slot and the second symbol index corresponds to the index of the initial symbol of the second mini-slot. For example, if a particular mini-slot starts at symbol index 7, then PRB index=7. In some designs, the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot. In some designs, the first PSFCH resource is determined based at least in part upon a first index associated with the first PSSCH and a first slot position of the first preceding slot, the second PSFCH resource is determined based at least in part upon a second index associated with the second corresponding first PSSCH in the second preceding slot and a second slot position of the second preceding slot, the third PSFCH resource is determined based at least in part upon a third index associated with the third PSSCH and the first slot position of the first preceding slot, and the fourth PSFCH resource is determined based at least in part upon a fourth index associated with the fourth PSSCH and the second slot position of the second preceding slot. A detailed example of this aspect is described below.

In an aspect, a PSFCH resource (e.g., initial cyclic shift and frequency domain location HARQ-ACK RB) is determined using $(P_{ID}+M_{ID}+(S-\text{const}))$ mod $R_{PRB,CS}^{PSFCH}$ where S is the starting symbol index of the corresponding mini-slot PSSCH and const is a constant resource pool/SL parameter. In some designs, const=1 (e.g., in slot based transmission, PSSCH starts at symbol index 1). In some designs, the PSFCH resource (PRB index[location] and initial cyclic shift) for a PSFCH corresponding to a mini-slot PSSCH of a slot is based on a symbol index associated with the mini-slot PSSCH (e.g., starting symbol index of the mini-slot PSSCH) in the slot. For example, for the slot format 1100 depicted in FIG. 11 where S=1 for mini-slot 1 and S=8 for mini-slot 2, ACK/NACK RB for mini-slot 1 will be at $(P_{ID}+M_{ID}+(1-1))$ mod $R_{PRB,CS}^{PSFCH}$, and ACK/NACK RB for mini-slot 2 will be at $(P_{ID}+M_{ID}+(8-1))$ mod $R_{PRB,CS}^{PSFCH}$.

Figure 17:
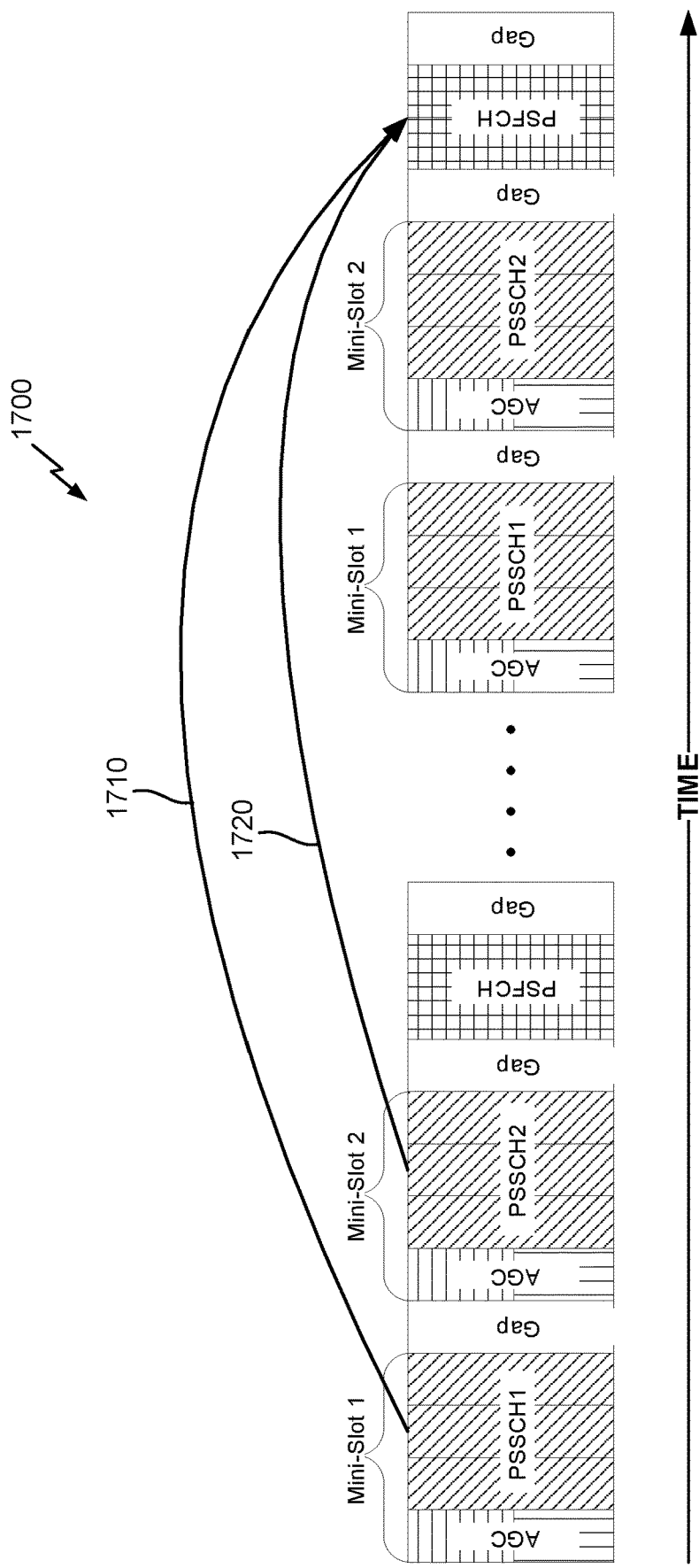
FIG. 17 illustrates an example implementation of the processes of FIGS. 15-16, respectively, in accordance with aspects of the disclosure.

FIG. 17 illustrates an example implementation of the processes 1500-1600 of FIGS. 15-16, respectively, in accordance with aspects of the disclosure. In FIG. 17, a first sidelink slot is followed by a second sidelink slot, optionally with one or more additional sidelink slots arranged in between. The first and second sidelink slots each include two mini-slots and an PSFCH. The PSFCH of the second sidelink slot is used to ACK or NACK the PSSCH(s) of the first sidelink slot. For example, mini-slot 1 of the first sidelink slot is ACKed or NACKed by the PSFCH of the second sidelink slot as shown at 1710, and mini-slot 2 of the first sidelink slot is ACKed or NACKed by the PFSCH of the second sidelink slot as shown at 1720. In some designs, a minimum of sl-MinTimeGapPSFCH slot(s) are arranged between the slot containing PSSCH (first sidelink slot) and the slot containing corresponding PSFCH that provides the ACK/NACK (second sidelink slot).

Figure 18:
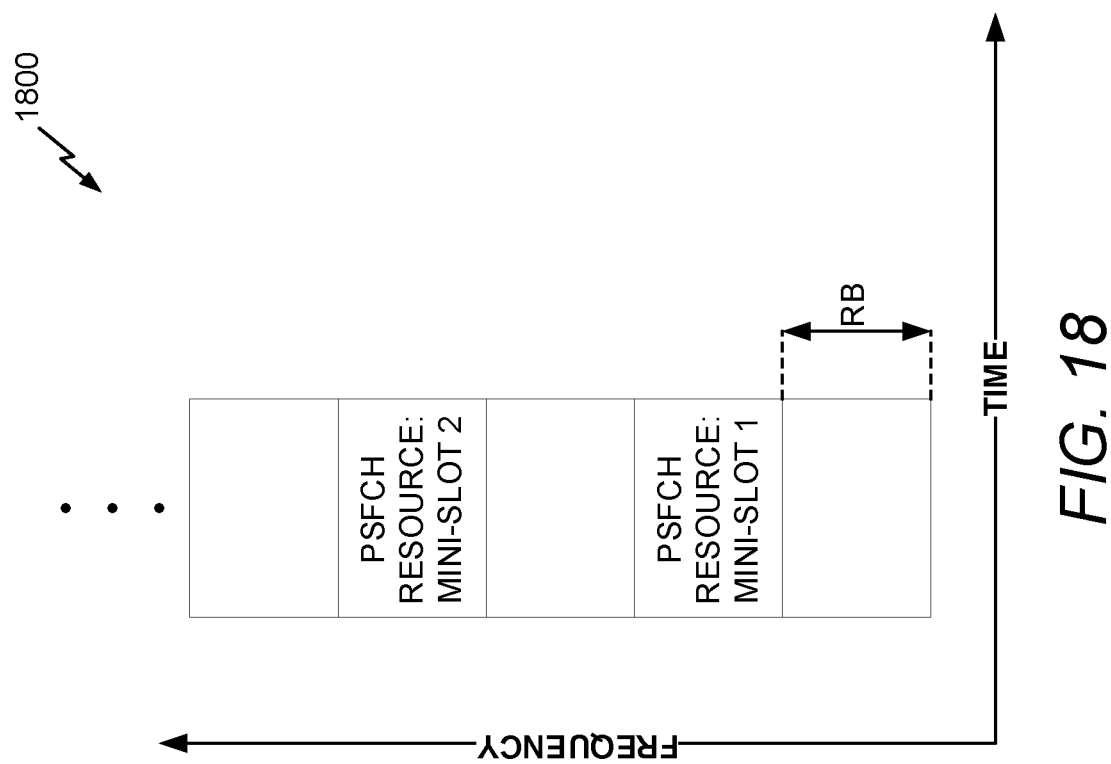
FIG. 18 illustrates a PSFCH symbol configuration in accordance with aspects of the disclosure.

FIG. 18 illustrates a PSFCH symbol configuration 1800 in accordance with aspects of the disclosure. The PSFCH symbol configuration 1800 includes a plurality of PSFCH resources, each of which may correspond to an RB and an initial cyclic shift. As noted above, the particular PSFCH resource (initial cyclic shift and freq. domain location HARQ-ACK RB) for ACKing or NACKing a corresponding PSSCH may be determined using $(P_{ID}+M_{ID}+(S-const))$ mod $R_{PRB,CS}^{PSFCH}$ where S is the starting symbol index of the corresponding mini-slot PSSCH and const is a constant resource pool/SL parameter, whereby $R_{PRB,CS}^{PSFCH}$ is a number of PSFCH resources available for multiplexing HARQ-ACK information in a PSFCH transmission. In some designs, two or more repetitions of the PSFCH symbol configuration 1800 may be part of the PSFCH.

Figure 19:
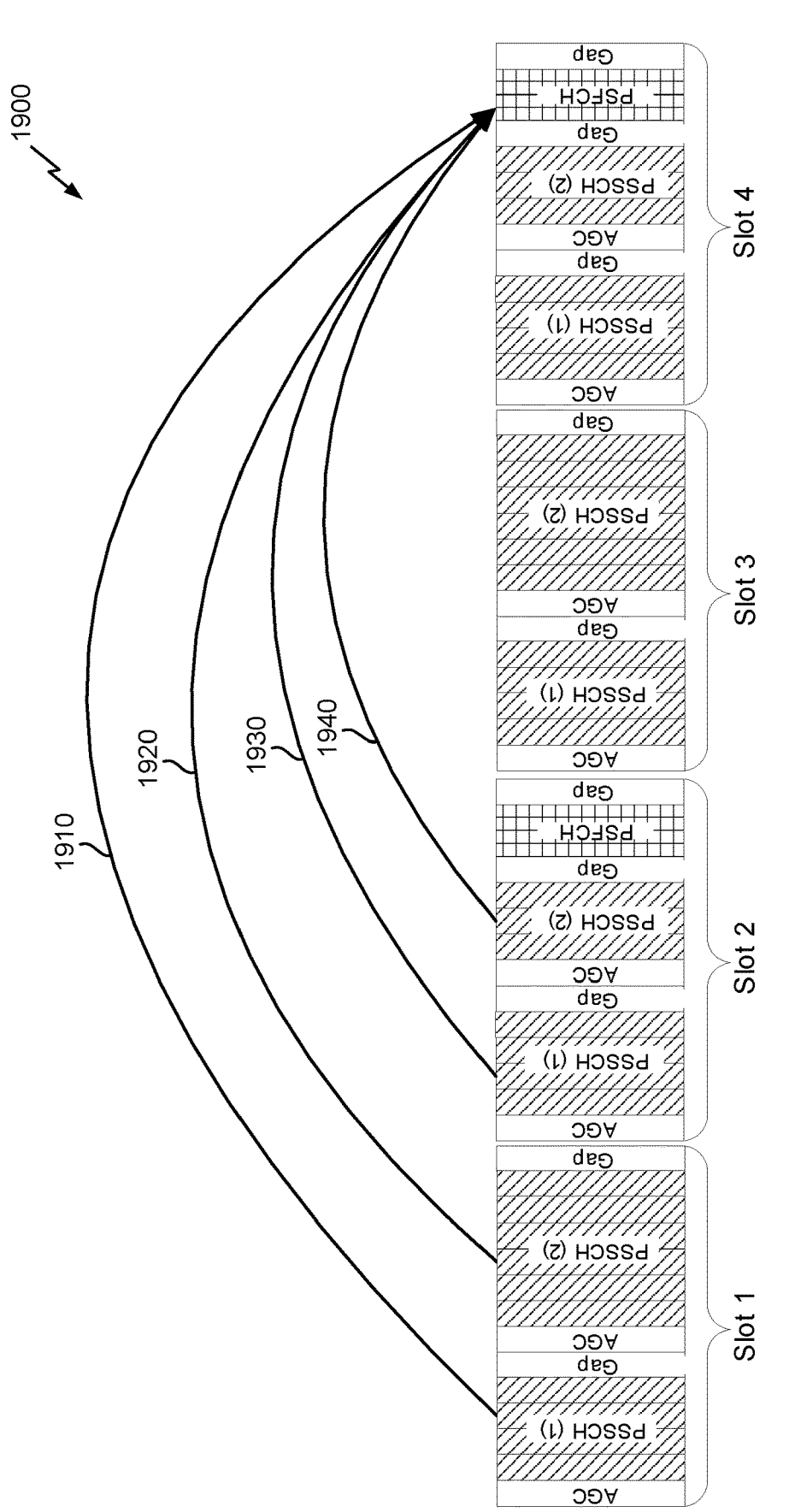
FIG. 19 illustrates an example implementation of the processes 15 of FIGS. 15-16, respectively, in accordance with aspects of the disclosure.

FIG. 19 illustrates an example implementation of the processes 1500-1600 of FIGS. 15-16, respectively, in accordance with aspects of the disclosure. In FIG. 19, sidelink slots 1-4 are depicted, whereby mini-slots associated with sidelink slots 1-2 are ACKed or NACKed via the PSFCH of sidelink slot 4 (e.g., the PSFCH of sidelink slot 2 may be used to ACK or NACK PS SCH(s) of earlier sidelink slots, not shown in FIG. 19). Sidelink slots 1 and 3 include PSSCH 1 and PSSCH 2, while sidelink slots 2 and 4 include PSSCH 1 and PSSCH 2 along with PSFCH. For example, sl-MinTimeGapPSFCH=1, and sl-PSFCH-Period=2, i.e., every other SL slot has PSFCH symbols. The PSFCH of the sidelink slot 4 is used to ACK or NACK the PSSCH(s) of sidelink slots 1 and 2, as shown at 1910, 1920, 1930 and 1940. In some designs, because many ACK/NACKs could be transmitted and received in the PSFCH symbols, the ACK/NACKs may be multiplexed in frequency domain as well as in initial cyclic shift ($m_0$) domain, as discussed above with respect to FIG. 18. For example, ACK/NACK for mini-slot 1 of sidelink slot 1 may be carried in one RB (e.g., RB1) and ACK/NACK for mini-slot 1 of sidelink slot 2 may be carried in another RB (e.g., RB2), or the ACK/NACK for mini-slot 1 of sidelink slots 1-2 may have different cyclic shifts (e.g., $m_0$=0 for mini-slot 1 of slot 1 and $m_0$=3 for mini-slot 1 of slot 2), or both. In some designs, the multiplexing of RBs for ACK/NACK of mini-slots may be performed in frequency domain and in cyclic shift domain based at least in part upon an index (e.g., symbol index) associated with a respective mini-slot.

In various examples related to FIGS. 15-16 described above, $M_{ID}$=0, and cyclic shift offset ($m_{cs}$) is based on the information content of PSFCH (e.g., 0 for NACK and 6 for ACK, or 0 for NACK). In this case, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

In some designs for NACK-only scenario, additional cyclic shifts ($m_{cs}$) may be supported. In this case, in some designs, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource. For example, for a slot with two mini-slots (e.g., as in FIG. 11), $m_{cs}$ may be 0 or 6 (e.g., mini-slot 1 Rx UE(s) transmit PUCCH format 0 with $m_{cs}$=0 for NACK, and mini-slot 2 Rx UE(s) transmit PUCCH format 0 with $m_{cs}$=6 for NACK). In a further example, for a slot with three mini-slots (e.g., as in 1280 of FIG. 12), $m_{cs}$ may be 0, 4 or 8 (e.g., mini-slot 1 Rx UE(s) transmit PUCCH format 0 with $m_{cs}$=0 for NACK, mini-slot 2 Rx UE(s) transmit PUCCH format 0 with $m_{cs}$=4 for NACK, and mini-slot 3 Rx UE(s) transmit PUCCH format 0 with $m_{cs}$=8 for NACK).

Referring to FIGS. 17-18, in some designs, the PSFCH resource for NACKing a PSSCH (mini-slot) is determined using $(P_{ID}+M_{ID}))$ mod $R_{PRB,CS}^{PSFCH}$, whereby $R_{PRB,CS}^{PSFCH}$ is a number of PSFCH resources available for multiplexing HARQ-ACK information in a PSFCH transmission. In an aspect, an $m_{cs}$ value for computing a value of cyclic shift a may be based on whether the UE detects a SCI format 2-B or a SCI format 2-A with Cast type indicator field value of "11" ('11' means groupcast with only NACK), e.g.:

TABLE 2

| 2 Mini-Slot Configuration, $m_{cs}$ value = 0, 6 | | |
|---|---|---|
| HARQ-ACK Value | 0 (NACK) | 1 (ACK) |
| Sequence Cyclic Shift for 1$^{st}$ Mini-Slot in a Slot | 0 | N/A |
| Sequence Cyclic Shift for 2$^{nd}$ Mini-Slot in a Slot | 6 | N/A |

TABLE 2

| 2 Mini-Slot Configuration, $m_{cs}$ value = 0, 6 | | |
|---|---|---|
| HARQ-ACK Value | 0 (NACK) | 1 (ACK) |
| Sequence Cyclic Shift for 1$^{st}$ Mini-Slot in a Slot | 0 | N/A |
| Sequence Cyclic Shift for 2$^{nd}$ Mini-Slot in a Slot | 4 | N/A |
| Sequence Cyclic Shift for 3$^{rd}$ Mini-Slot in a Slot | 8 | N/A |

Referring to FIG. 19 with respect to NACK-only scenario, NACK for min-slots 1 and 2 of slots 1 and 2 may be transmitted and received in the PSFCH symbols of slot 4. Because many NACKs may be transmitted and received in the PSFCH symbols, the NACKs may be multiplexed in frequency domain as well as in cyclic shift domain ($m_0$ and $m_{cs}$). For example, NACK for mini-slot 1 of slot 1 may be carried in one RB (e.g., RB1) and NACK for mini-slot 1 of slot 2 may be carried in another RB (e.g., RB2), or the respective NACKs may have different cyclic shifts (e.g., $m_0$=0 for mini-slot 1 of slot 1 and $m_0$=3 for mini-slot 1 of slot 2), or both. In this case, the multiplexing in $m_{cs}$ cyclic shift domain may be based on an index (e.g., symbol index) associated with a mini-slot (or mini-slot index in a slot, for example 1$^{st}$ mini-slot, 2$^{nd}$ mini-slot, etc.).

Referring to FIGS. 15-16, in some designs, the first set of PSFCH resources includes a first resource block (RB) index and a first initial cyclic shift, and is determined based at least in part upon a first slot index associated with the first mini-slot, and the second set of PSFCH resources comprises a second RB index and a second initial cyclic shift, and is determined based at least in part upon a second slot index associated with the second mini-slot. In some designs, the cyclic shift $m_{cs}$ value is determined based on the information content of PSFCH, i.e., ACK or NACK. In some designs, if there are only 2 mini-slots in a slot, the above-noted slot-based solution may be used because a UE will not typically transmit both mini-slots in a slot to the same UE. That is $P_{ID}$ and $M_{ID}$ will likely be different in $(P_{ID}+M_{ID})$ mod $R_{PRB,CS}^{PSFCH}$. Thus, PSFCH resources will be different for PSFCHs for those two mini-slots. However, if there are 3 mini-slots in a slot, the above-noted slot-based solution may not work as there is a good chance that two of the 3 mini-slots will be transmitted to one UE (say UE1). If UE 1 receives the $1^{st}$ of the two mini-slots correctly but not the $2^{nd}$ one, then it would not be possible with the slot-based solution for UE 1 to individually convey the ACK/NACK of both mini-slots to the transmitting UE. In this case, one or more of the mini-slot index-based approaches described above may be implemented rather than a slot index-based approach.

Figure 20:
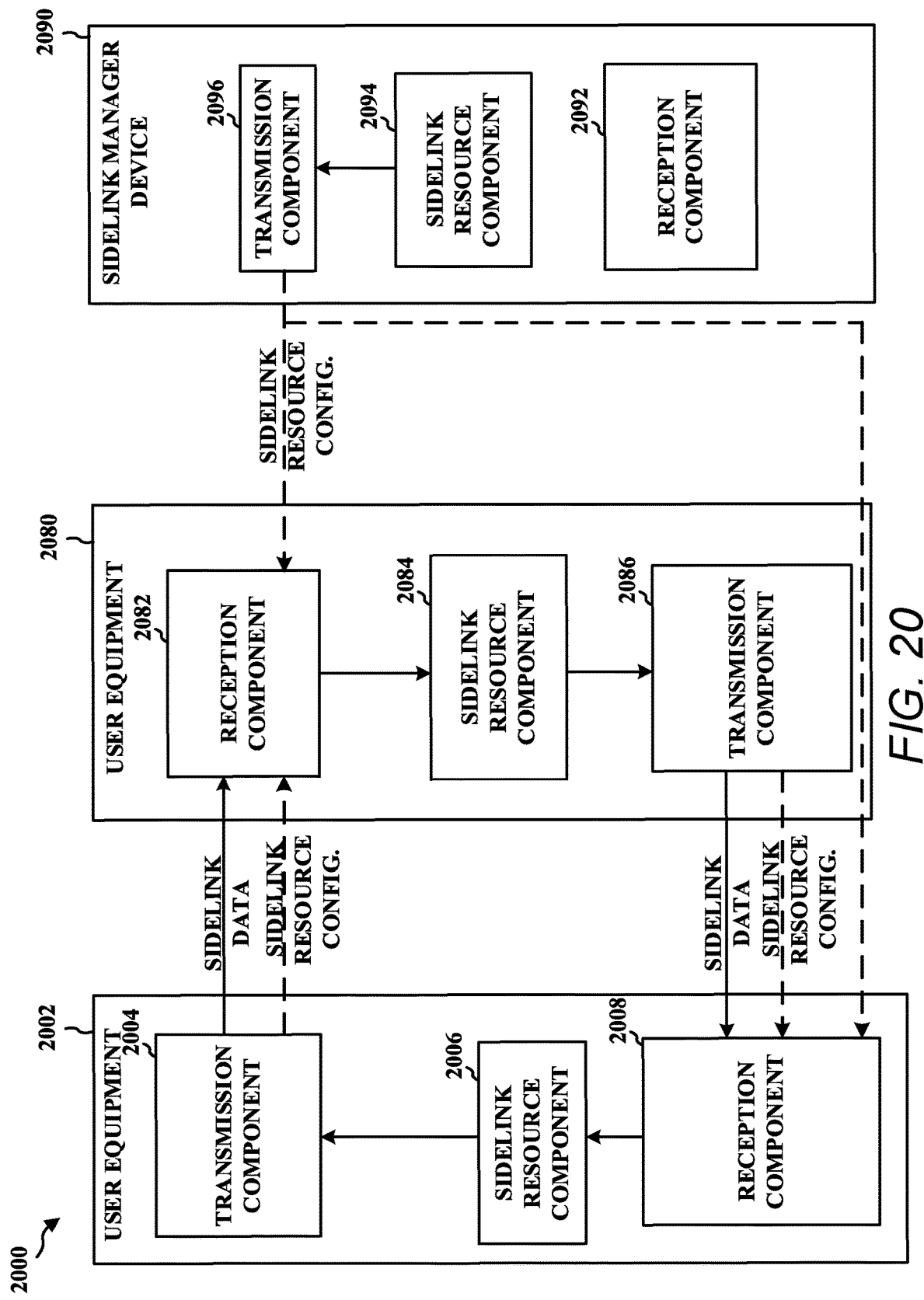
FIG. 20 is a conceptual data flow diagram illustrating the data flow between different means/components in exemplary apparatuses in accordance with an aspect of the disclosure.

FIG. 20 is a conceptual data flow diagram 2000 illustrating the data flow between different means/components in exemplary apparatuses 2002, 2080 and 2090 in accordance with an aspect of the disclosure. The apparatus 2002 may be a UE (e.g., UE 302) in communication with an apparatus 2080, which may be another UE (e.g., UE 302). In some designs, the apparatuses 2002 and/or 2080 may further be in communication with a sidelink manager device 2090 (e.g., BS 304 or network entity 306, or another UE 302), although the sidelink manager device 2090 may alternatively be integrated into one of the apparatuses 2002 or 2080.

The apparatus 2002 includes a transmission component 2004, which may correspond to transmitter circuitry in UE 302 as depicted in FIG. 3A, including transmitter(s) 314 and 324, antenna(s) 316 and 326, etc. The apparatus 2002 further includes sidelink resource component 2006, which may correspond to processor circuitry in UE 302 as depicted in FIG. 3A, including processing system 332, etc. The apparatus 2002 further includes a reception component 2008, which may correspond to receiver circuitry in UE 302 as depicted in FIG. 3A, including receiver(s) 312 and 322, antenna(s) 316 and 326, etc.

The apparatus 2080 includes a transmission component 2086, which may correspond to transmitter circuitry in UE 302 as depicted in FIG. 3A, including transmitter(s) 314 and 324, antenna(s) 316 and 326, etc. The apparatus 2080 further includes sidelink resource component 2084, which may correspond to processor circuitry in UE 302 as depicted in FIG. 3A, including processing system 332, etc. The apparatus 2080 further includes a reception component 2082, which may correspond to receiver circuitry in UE 302 as depicted in FIG. 3A, including receiver(s) 312 and 322, antenna(s) 316 and 326, etc.

The apparatus 2090 includes a transmission component 296, which may correspond to transmitter circuitry in UE 302 or BS 304 as depicted in FIG. 3A or FIG. 3B, including transmitter(s) 314 or 324 or 354 or 364, antenna(s) 316 or 326 or 356 or 366, etc., or to network transceiver(s) such as network transceiver(s) 380 or 390 of BS 304 or network entity 306. The apparatus 2090 further includes sidelink resource component 2094, which may correspond to processor circuitry in UE 302 or BS 304 or network entity 306 as depicted in FIGS. 3A-3C, including processing(s) 332 or 384 or 394, etc. The apparatus 2090 further includes a reception component 2092, which may correspond to receiver circuitry in UE 302 or BS 304 as depicted in FIG. 3A or FIG. 3B, including receiver(s) 312 or 322 or 352 or 362, antenna(s) 316 or 326 or 356 or 366, etc., or to network transceiver(s) such as network transceiver(s) 380 or 390 of BS 304 or network entity 306.

Referring to FIG. 20, the apparatus 2002 and apparatus 2080 may engage in sidelink communication, whereby sidelink data is transmitted from transmission component 2086 to reception component 2008, or sidelink data is transmitted from transmission component 2004 to reception component 2082, or a combination thereof. In some designs, the sidelink data is communicated via mini-slot(s) of a sidelink resource configuration. In some designs, the sidelink resource configuration may optionally be transmitted by transmission component 2096 to the reception component 2008 or the reception component 2082 or a combination thereof (e.g., for Mode 1 sidelink). In other designs, the sidelink resource configuration may optionally be transmitted by transmission component 2086 to the reception component 2008 or by transmission component 2004 to the reception component 2082 (e.g., for Mode 2 sidelink).

One or more components of the apparatus 2002 and apparatus 2080 and apparatus 2090 may perform each of the blocks of the algorithm in the aforementioned flowcharts of FIGS. 15-16. As such, each block in the aforementioned flowcharts of FIGS. 15-16 may be performed by a component and the apparatus 2002 and apparatus 2080 and apparatus 2090 may include one or more of those components. In particular, the UE 302 that performs the process 1500 of FIG. 15 may correspond to the apparatus 2002, the apparatus 2080, or both, and the sidelink manager device that performs the process 1600 of FIG. 1 may correspond to one of the apparatus 2002, the apparatus 2080, the apparatus 2090. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
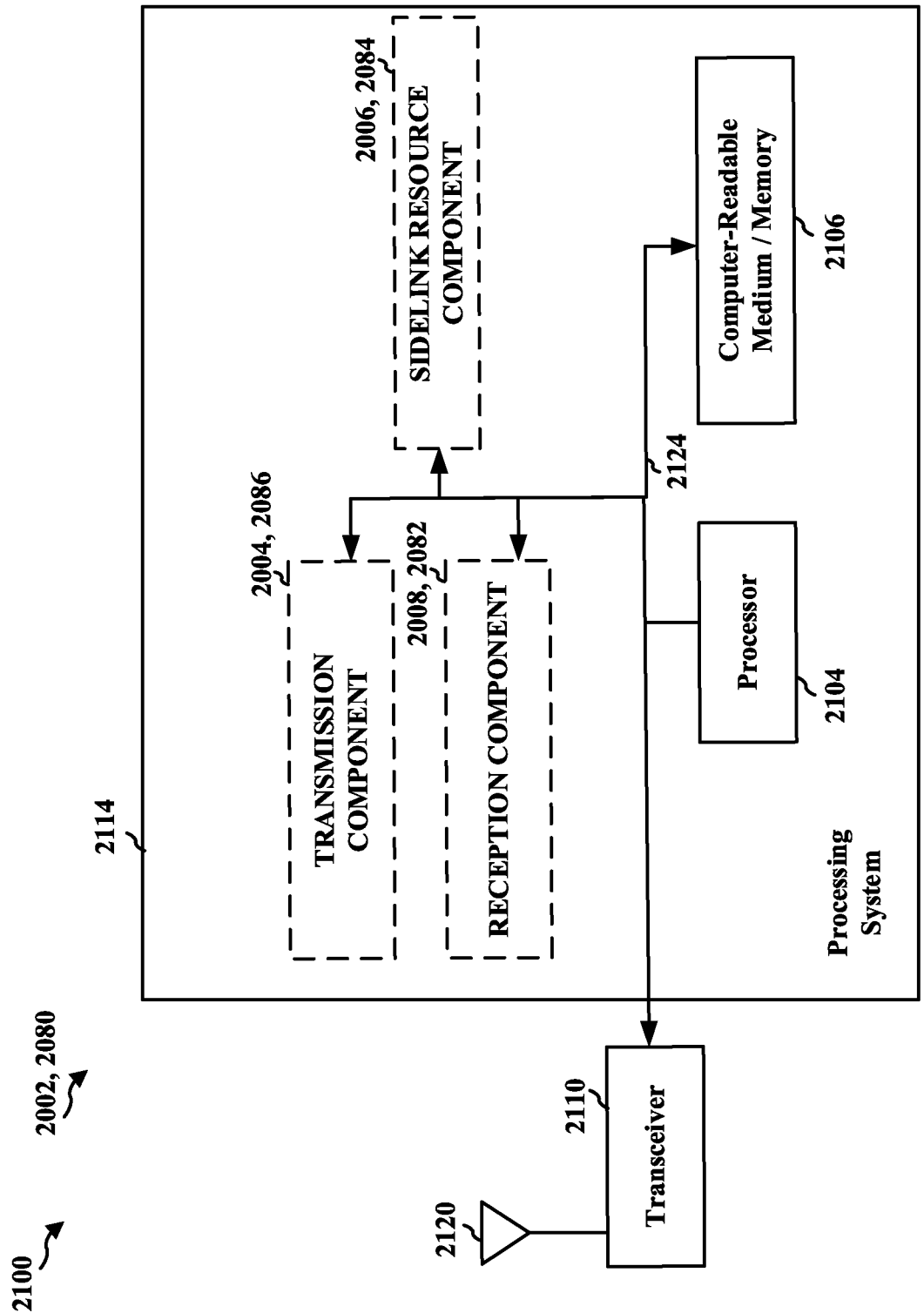
FIGS. 21-22 are diagrams illustrating examples of hardware implementations for apparatuses employing processing systems.

FIG. 21 is a diagram 2100 illustrating an example of a hardware implementation for an apparatus 2002 or the apparatus 2080 employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006 and 2008 or components 2092, 2094 and 2096, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2008 or 2092. In addition, the transceiver 2110 receives information from the processing system 2114, specifically the transmission component 2004 or the transmission component 2086, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006 and 2008 or at least one of the components 2082, 2084 and 2086. The components may be software components running in the processor 2104, resident/stored in the computer readable medium/memory 2106, one or more hardware components coupled to the processor 2104, or some combination thereof.

In one configuration, the apparatus 2002 (e.g., a UE) or the apparatus 2080 (e.g., a UE) for wireless communication includes means for determining a sidelink resource configuration for a slot, wherein the sidelink resource configuration includes a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots, and means for communicating data over at least a portion (e.g., some or all) of the slot in accordance with the sidelink resource configuration.

The aforementioned means may be one or more of the aforementioned components of the apparatus 2002 or apparatus 2080 and/or the processing system 2114 of the apparatus 2002 or apparatus 2080 configured to perform the functions recited by the aforementioned means.

Figure 22:
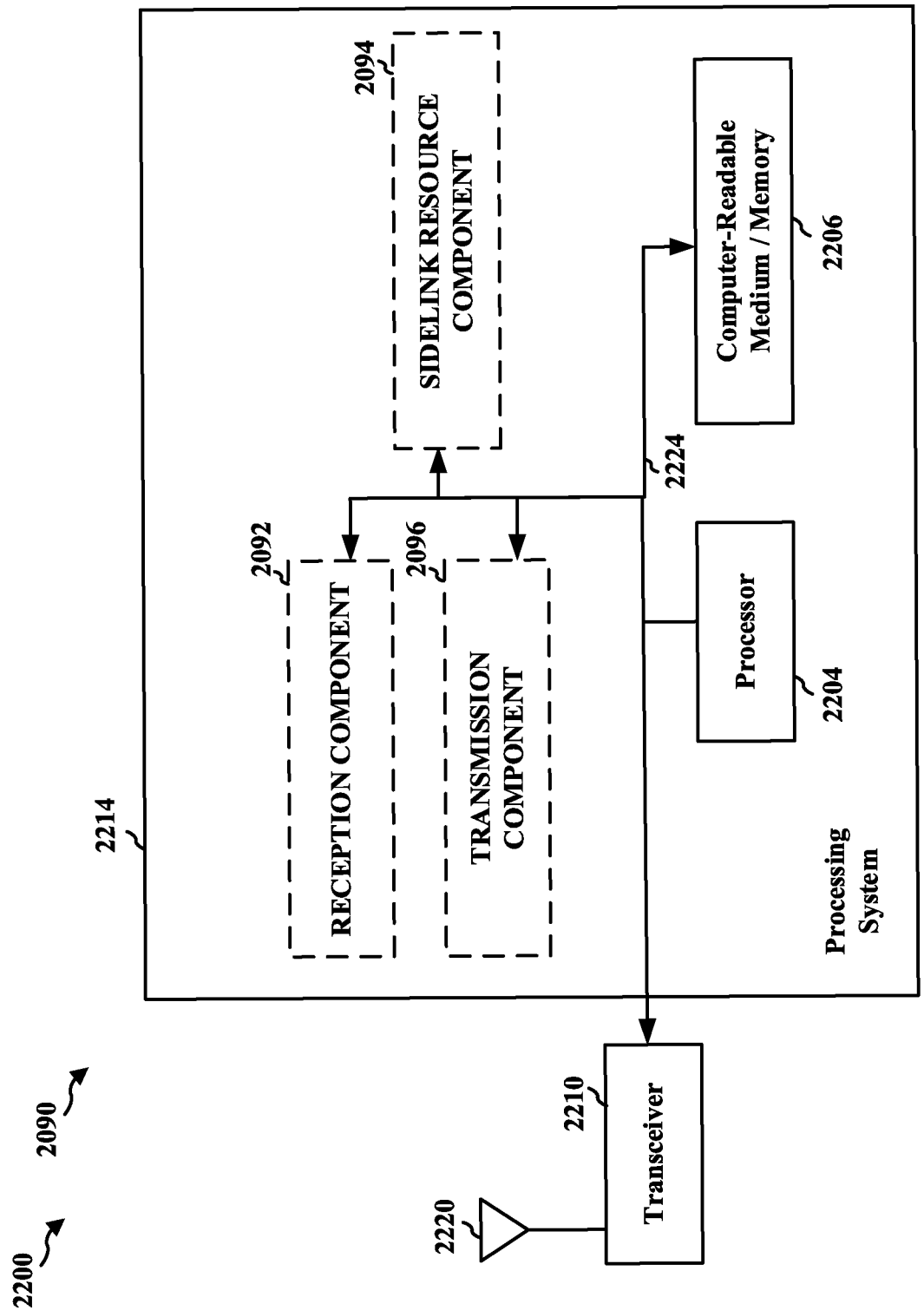

FIG. 22 is a diagram 2200 illustrating an example of a hardware implementation for an apparatus 2090 employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2092, 2094 and 2096, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2092. In addition, the transceiver 2210 receives information from the processing system 2214, specifically the transmission component 2096, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2092, 2094 and 2096. The components may be software components running in the processor 2204, resident/stored in the computer readable medium/memory 2206, one or more hardware components coupled to the processor 2204, or some combination thereof.

In one configuration, the apparatus 2090 (e.g., a UE, BS or network entity) for wireless communication may include means for determining a sidelink resource configuration for a slot, wherein the sidelink resource configuration includes a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and means for transmitting the sidelink resource configuration to one or more user equipments (UEs) associated with communication of the first PSSCH, the second PSSCH, the PSFCH, or a combination thereof.

The aforementioned means may be one or more of the aforementioned components of the apparatus 2090 and/or the processing system 2214 of the apparatus 2090 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: determining a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and communicating data over at least a portion of the slot in accordance with the sidelink resource configuration.

Clause 2. The method of clause 1, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

Clause 3. The method of any of clauses 1 to 2, wherein the PSFCH comprises a set of symbols, and wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots.

Clause 4. The method of clause 3, wherein each PSFCH resource among the first set of PSFCH resources and the second set of PSFCH resources comprises a physical resource block (PRB) index and an initial cyclic shift.

Clause 5. The method of any of clauses 3 to 4, wherein the set of symbols comprises multiple PSFCH symbol repetitions.

Clause 6. The method of any of clauses 3 to 5, wherein the first set of PSFCH resources is determined based at least in part upon a first index associated with the first mini-slot, and wherein the second set of PSFCH resources is determined based at least in part upon a second index associated with the second mini-slot.

Clause 7. The method of clause 6, wherein the first index corresponds to a first mini-slot order index and the second index corresponds to a second mini-slot order index.

Clause 8. The method of any of clauses 6 to 7, wherein the first index corresponds to a first symbol index and the second index corresponds to a second symbol index.

Clause 9. The method of clause 8, wherein the first symbol index corresponds to an initial symbol index of the first mini-slot and the second symbol index corresponds to an initial symbol index of the second mini-slot.

Clause 10. The method of any of clauses 3 to 9, wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

Clause 11. The method of clause 10, wherein the first PSFCH resource is determined based at least in part upon a first index associated with the first PSSCH and a first slot position of the first preceding slot, wherein the second PSFCH resource is determined based at least in part upon a second index associated with the second PSSCH and a second slot position of the second preceding slot, wherein the third PSFCH resource is determined based at least in part upon a third index associated with the third PSSCH and the first slot position of the first preceding slot, and wherein the fourth PSFCH resource is determined based at least in part upon a fourth index associated with the fourth PSSCH and the second slot position of the second preceding slot.

Clause 12. The method of any of clauses 3 to 11, wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

Clause 13. The method of any of clauses 3 to 12, wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

Clause 14. The method of any of clauses 3 to 13, wherein the first set of PSFCH resources comprises a first resource block (RB) index and a first initial cyclic shift, and is determined based at least in part upon a first slot index associated with the first mini-slot, and wherein the second set of PSFCH resources comprises a second RB index and a second initial cyclic shift, and is determined based at least in part upon a second slot index associated with the second mini-slot.

Clause 15. The method of any of clauses 1 to 14, wherein the communicated data comprises data transmitted on the first PSSCH, wherein the communicated data comprises data received on the first PSSCH, wherein the communicated data comprises data transmitted on the PSFCH, wherein the communicated data comprises data received on the PSFCH, wherein the communicated data comprises data transmitted on the second PSSCH, wherein the communicated data comprises data received on the second PSSCH, or a combination thereof.

Clause 16. A method of operating a sidelink management device, comprising: determining a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and transmitting the sidelink resource configuration to one or more user equipments (UEs) associated with communication of the first PSSCH, the second PSSCH, the PSFCH, or a combination thereof.

Clause 17. The method of clause 16, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

Clause 18. The method of any of clauses 16 to 17, wherein the PSFCH comprises a set of symbols, and wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots.

Clause 19. The method of clause 18, wherein each PSFCH resource among the first set of PSFCH resources and the second set of PSFCH resources comprises a physical resource block (PRB) index and an initial cyclic shift, or wherein the set of symbols comprises multiple PSFCH symbol repetitions, or a combination thereof.

Clause 20. The method of any of clauses 18 to 19, wherein the first set of PSFCH resources is determined based at least in part upon a first index associated with the first mini-slot, and wherein the second set of PSFCH resources is determined based at least in part upon a second index associated with the second mini-slot.

Clause 21. The method of clause 20, wherein the first index corresponds to a first mini-slot order index and the second index corresponds to a second mini-slot order index.

Clause 22. The method of any of clauses 20 to 21, wherein the first index corresponds to a first symbol index and the second index corresponds to a second symbol index.

Clause 23. The method of clause 22, wherein the first symbol index corresponds to an initial symbol index of the first mini-slot and the second symbol index corresponds to an initial symbol index of the second mini-slot.

Clause 24. The method of any of clauses 20 to 23, wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

Clause 25. The method of clause 24, wherein the first PSFCH resource is determined based at least in part upon a first index associated with the first PSSCH and a first slot position of the first preceding slot, wherein the second PSFCH resource is determined based at least in part upon a second index associated with the second PSSCH and a second slot position of the second preceding slot, wherein the third PSFCH resource is determined based at least in part upon a third index associated with the third PSSCH and the first slot position of the first preceding slot, and wherein the fourth PSFCH resource is determined based at least in part upon a fourth index associated with the fourth PSSCH and the second slot position of the second preceding slot.

Clause 26. The method of any of clauses 18 to 25, wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

Clause 27. The method of any of clauses 18 to 26, wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

Clause 28. The method of any of clauses 18 to 27, wherein the first set of PSFCH resources comprises a first resource block (RB) index and a first initial cyclic shift, and is determined based at least in part upon a first slot index associated with the first mini-slot, and wherein the second set of PSFCH resources comprises a second RB index and a second initial cyclic shift, and is determined based at least in part upon a second slot index associated with the second mini-slot.

Clause 29. A user equipment (UE), comprising: a memory; at least one transceiver; and at least one processor communicatively coupled to the memory and the at least one transceiver, the at least one processor configured to: determine a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and communicate, via the at least one transceiver, data over at least a portion of the slot in accordance with the sidelink resource configuration.

Clause 30. The UE of clause 29, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

Clause 31. The UE of any of clauses 29 to 30, wherein the PSFCH comprises a set of symbols, and wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots.

Clause 32. The UE of clause 31, wherein each PSFCH resource among the first set of PSFCH resources and the second set of PSFCH resources comprises a physical resource block (PRB) index and an initial cyclic shift.

Clause 33. The UE of any of clauses 31 to 32, wherein the set of symbols comprises multiple PSFCH symbol repetitions.

Clause 34. The UE of any of clauses 31 to 33, wherein the first set of PSFCH resources is determined based at least in part upon a first index associated with the first mini-slot, and wherein the second set of PSFCH resources is determined based at least in part upon a second index associated with the second mini-slot.

Clause 35. The UE of clause 34, wherein the first index corresponds to a first mini-slot order index and the second index corresponds to a second mini-slot order index.

Clause 36. The UE of any of clauses 34 to 35, wherein the first index corresponds to a first symbol index and the second index corresponds to a second symbol index.

Clause 37. The UE of clause 36, wherein the first symbol index corresponds to an initial symbol index of the first mini-slot and the second symbol index corresponds to an initial symbol index of the second mini-slot.

Clause 38. The UE of any of clauses 31 to 37, wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

Clause 39. The UE of clause 38, wherein the first PSFCH resource is determined based at least in part upon a first index associated with the first PSSCH and a first slot position of the first preceding slot, wherein the second PSFCH resource is determined based at least in part upon a second index associated with the second PSSCH and a second slot position of the second preceding slot, wherein the third PSFCH resource is determined based at least in part upon a third index associated with the third PSSCH and the first slot position of the first preceding slot, and wherein the fourth PSFCH resource is determined based at least in part upon a fourth index associated with the fourth PS SCH and the second slot position of the second preceding slot.

Clause 40. The UE of any of clauses 31 to 39, wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

Clause 41. The UE of any of clauses 31 to 40, wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

Clause 42. The UE of any of clauses 31 to 41, wherein the first set of PSFCH resources comprises a first resource block (RB) index and a first initial cyclic shift, and is determined based at least in part upon a first slot index associated with the first mini-slot, and wherein the second set of PSFCH resources comprises a second RB index and a second initial cyclic shift, and is determined based at least in part upon a second slot index associated with the second mini-slot.

Clause 43. The UE of any of clauses 29 to 42, wherein the communicated data comprises data transmitted on the first PSSCH, wherein the communicated data comprises data received on the first PSSCH, wherein the communicated data comprises data transmitted on the PSFCH, wherein the communicated data comprises data received on the PSFCH, wherein the communicated data comprises data transmitted on the second PSSCH, wherein the communicated data comprises data received on the second PSSCH, or a combination thereof.

Clause 44. A sidelink management device, comprising: a memory; at least one transceiver; and at least one processor communicatively coupled to the memory and the at least one transceiver, the at least one processor configured to: determine a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and transmit, via the at least one transceiver, the sidelink resource configuration to one or more user equipments (UEs) associated with communication of the first PSSCH, the second PSSCH, the PSFCH, or a combination thereof.

Clause 45. The sidelink management device of clause 44, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

Clause 46. The sidelink management device of any of clauses 44 to 45, wherein the PSFCH comprises a set of symbols, and wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots.

Clause 47. The sidelink management device of clause 46, wherein each PSFCH resource among the first set of PSFCH resources and the second set of PSFCH resources comprises a physical resource block (PRB) index and an initial cyclic shift, or wherein the set of symbols comprises multiple PSFCH symbol repetitions, or a combination thereof.

Clause 48. The sidelink management device of any of clauses 46 to 47, wherein the first set of PSFCH resources is determined based at least in part upon a first index associated with the first mini-slot, and wherein the second set of PSFCH resources is determined based at least in part upon a second index associated with the second mini-slot.

Clause 49. The sidelink management device of clause 48, wherein the first index corresponds to a first mini-slot order index and the second index corresponds to a second mini-slot order index.

Clause 50. The sidelink management device of any of clauses 48 to 49, wherein the first index corresponds to a first symbol index and the second index corresponds to a second symbol index.

Clause 51. The sidelink management device of clause 50, wherein the first symbol index corresponds to an initial symbol index of the first mini-slot and the second symbol index corresponds to an initial symbol index of the second mini-slot.

Clause 52. The sidelink management device of any of clauses 48 to 51, wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

Clause 53. The sidelink management device of clause 52, wherein the first PSFCH resource is determined based at least in part upon a first index associated with the first PSSCH and a first slot position of the first preceding slot, wherein the second PSFCH resource is determined based at least in part upon a second index associated with the second PSSCH and a second slot position of the second preceding slot, wherein the third PSFCH resource is determined based at least in part upon a third index associated with the third PSSCH and the first slot position of the first preceding slot, and wherein the fourth PSFCH resource is determined based at least in part upon a fourth index associated with the fourth PSSCH and the second slot position of the second preceding slot.

Clause 54. The sidelink management device of any of clauses 46 to 53, wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

Clause 55. The sidelink management device of any of clauses 46 to 54, wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

Clause 56. The sidelink management device of any of clauses 46 to 55, wherein the first set of PSFCH resources comprises a first resource block (RB) index and a first initial cyclic shift, and is determined based at least in part upon a first slot index associated with the first mini-slot, and wherein the second set of PSFCH resources comprises a second RB index and a second initial cyclic shift, and is determined based at least in part upon a second slot index associated with the second mini-slot.

Clause 57. A user equipment (UE), comprising: means for determining a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and means for communicating data over at least a portion of the slot in accordance with the sidelink resource configuration.

Clause 58. The UE of clause 57, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

Clause 59. The UE of any of clauses 57 to 58, wherein the PSFCH comprises a set of symbols, and wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots.

Clause 60. The UE of clause 59, wherein each PSFCH resource among the first set of PSFCH resources and the second set of PSFCH resources comprises a physical resource block (PRB) index and an initial cyclic shift.

Clause 61. The UE of any of clauses 59 to 60, wherein the set of symbols comprises multiple PSFCH symbol repetitions.

Clause 62. The UE of any of clauses 59 to 61, wherein the first set of PSFCH resources is determined based at least in part upon a first index associated with the first mini-slot, and wherein the second set of PSFCH resources is determined based at least in part upon a second index associated with the second mini-slot.

Clause 63. The UE of clause 62, wherein the first index corresponds to a first mini-slot order index and the second index corresponds to a second mini-slot order index.

Clause 64. The UE of any of clauses 62 to 63, wherein the first index corresponds to a first symbol index and the second index corresponds to a second symbol index.

Clause 65. The UE of clause 64, wherein the first symbol index corresponds to an initial symbol index of the first mini-slot and the second symbol index corresponds to an initial symbol index of the second mini-slot.

Clause 66. The UE of any of clauses 59 to 65, wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

Clause 67. The UE of clause 66, wherein the first PSFCH resource is determined based at least in part upon a first index associated with the first PSSCH and a first slot position of the first preceding slot, wherein the second PSFCH resource is determined based at least in part upon a second index associated with the second PSSCH and a second slot position of the second preceding slot, wherein the third PSFCH resource is determined based at least in part upon a third index associated with the third PSSCH and the first slot position of the first preceding slot, and wherein the fourth PSFCH resource is determined based at least in part upon a fourth index associated with the fourth PS SCH and the second slot position of the second preceding slot.

Clause 68. The UE of any of clauses 59 to 67, wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

Clause 69. The UE of any of clauses 59 to 68, wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

Clause 70. The UE of any of clauses 59 to 69, wherein the first set of PSFCH resources comprises a first resource block (RB) index and a first initial cyclic shift, and is determined based at least in part upon a first slot index associated with the first mini-slot, and wherein the second set of PSFCH resources comprises a second RB index and a second initial cyclic shift, and is determined based at least in part upon a second slot index associated with the second mini-slot.

Clause 71. The UE of any of clauses 57 to 70, wherein the communicated data comprises data transmitted on the first PSSCH, wherein the communicated data comprises data received on the first PSSCH, wherein the communicated data comprises data transmitted on the PSFCH, wherein the communicated data comprises data received on the PSFCH, wherein the communicated data comprises data transmitted on the second PSSCH, wherein the communicated data comprises data received on the second PSSCH, or a combination thereof.

Clause 72. A sidelink management device, comprising: means for determining a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and means for transmitting the sidelink resource configuration to one or more user equipments (UEs) associated with communication of the first PSSCH, the second PSSCH, the PSFCH, or a combination thereof.

Clause 73. The sidelink management device of clause 72, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

Clause 74. The sidelink management device of any of clauses 72 to 73, wherein the PSFCH comprises a set of symbols, and wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots.

Clause 75. The sidelink management device of clause 74, wherein each PSFCH resource among the first set of PSFCH resources and the second set of PSFCH resources comprises a physical resource block (PRB) index and an initial cyclic shift, or wherein the set of symbols comprises multiple PSFCH symbol repetitions, or a combination thereof.

Clause 76. The sidelink management device of any of clauses 74 to 75, wherein the first set of PSFCH resources is determined based at least in part upon a first index associated with the first mini-slot, and wherein the second set of PSFCH resources is determined based at least in part upon a second index associated with the second mini-slot.

Clause 77. The sidelink management device of clause 76, wherein the first index corresponds to a first mini-slot order index and the second index corresponds to a second mini-slot order index.

Clause 78. The sidelink management device of any of clauses 76 to 77, wherein the first index corresponds to a first symbol index and the second index corresponds to a second symbol index.

Clause 79. The sidelink management device of clause 78, wherein the first symbol index corresponds to an initial symbol index of the first mini-slot and the second symbol index corresponds to an initial symbol index of the second mini-slot.

Clause 80. The sidelink management device of any of clauses 76 to 79, wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

Clause 81. The sidelink management device of clause 80, wherein the first PSFCH resource is determined based at least in part upon a first index associated with the first PSSCH and a first slot position of the first preceding slot, wherein the second PSFCH resource is determined based at least in part upon a second index associated with the second PSSCH and a second slot position of the second preceding slot, wherein the third PSFCH resource is determined based at least in part upon a third index associated with the third PSSCH and the first slot position of the first preceding slot, and wherein the fourth PSFCH resource is determined based at least in part upon a fourth index associated with the fourth PSSCH and the second slot position of the second preceding slot.

Clause 82. The sidelink management device of any of clauses 74 to 81, wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

Clause 83. The sidelink management device of any of clauses 74 to 82, wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

Clause 84. The sidelink management device of any of clauses 74 to 83, wherein the first set of PSFCH resources comprises a first resource block (RB) index and a first initial cyclic shift, and is determined based at least in part upon a first slot index associated with the first mini-slot, and wherein the second set of PSFCH resources comprises a second RB index and a second initial cyclic shift, and is determined based at least in part upon a second slot index associated with the second mini-slot.

Clause 85. A non-transitory computer-readable medium storing computer-executable instructions that, when executed by a user equipment (UE), cause the UE to: determine a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and communicate data over at least a portion of the slot in accordance with the sidelink resource configuration.

Clause 86. The non-transitory computer-readable medium of clause 85, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

Clause 87. The non-transitory computer-readable medium of any of clauses 85 to 86, wherein the PSFCH comprises a set of symbols, and wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots.

Clause 88. The non-transitory computer-readable medium of clause 87, wherein each PSFCH resource among the first set of PSFCH resources and the second set of PSFCH resources comprises a physical resource block (PRB) index and an initial cyclic shift.

Clause 89. The non-transitory computer-readable medium of any of clauses 87 to 88, wherein the set of symbols comprises multiple PSFCH symbol repetitions.

Clause 90. The non-transitory computer-readable medium of any of clauses 87 to 89, wherein the first set of PSFCH resources is determined based at least in part upon a first index associated with the first mini-slot, and wherein the second set of PSFCH resources is determined based at least in part upon a second index associated with the second mini-slot.

Clause 91. The non-transitory computer-readable medium of clause 90, wherein the first index corresponds to a first mini-slot order index and the second index corresponds to a second mini-slot order index.

Clause 92. The non-transitory computer-readable medium of any of clauses 90 to 91, wherein the first index corresponds to a first symbol index and the second index corresponds to a second symbol index.

Clause 93. The non-transitory computer-readable medium of clause 92, wherein the first symbol index corresponds to an initial symbol index of the first mini-slot and the second symbol index corresponds to an initial symbol index of the second mini-slot.

Clause 94. The non-transitory computer-readable medium of any of clauses 87 to 93, wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

Clause 95. The non-transitory computer-readable medium of clause 94, wherein the first PSFCH resource is determined based at least in part upon a first index associated with the first PSSCH and a first slot position of the first preceding slot, wherein the second PSFCH resource is determined based at least in part upon a second index associated with the second PSSCH and a second slot position of the second preceding slot, wherein the third PSFCH resource is determined based at least in part upon a third index associated with the third PSSCH and the first slot position of the first preceding slot, and wherein the fourth PSFCH resource is determined based at least in part upon a fourth index associated with the fourth PSSCH and the second slot position of the second preceding slot.

Clause 96. The non-transitory computer-readable medium of any of clauses 87 to 95, wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

Clause 97. The non-transitory computer-readable medium of any of clauses 87 to 96, wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

Clause 98. The non-transitory computer-readable medium of any of clauses 87 to 97, wherein the first set of PSFCH resources comprises a first resource block (RB) index and a first initial cyclic shift, and is determined based at least in part upon a first slot index associated with the first mini-slot, and wherein the second set of PSFCH resources comprises a second RB index and a second initial cyclic shift, and is determined based at least in part upon a second slot index associated with the second mini-slot.

Clause 99. The non-transitory computer-readable medium of any of clauses 85 to 98, wherein the communicated data comprises data transmitted on the first PSSCH, wherein the communicated data comprises data received on the first PSSCH, wherein the communicated data comprises data transmitted on the PSFCH, wherein the communicated data comprises data received on the PSFCH, wherein the communicated data comprises data transmitted on the second PSSCH, wherein the communicated data comprises data received on the second PSSCH, or a combination thereof.

Clause 100. A non-transitory computer-readable medium storing computer-executable instructions that, when executed by a sidelink management device, cause the sidelink management device to: determine a sidelink resource configuration for a slot, wherein the sidelink resource configuration includes: a first set of resources carrying a first physical sidelink shared channel (PSSCH) in a first mini-slot of the slot, a second set of resources carrying a second PSSCH in a second mini-slot of the slot, and a third set of resources carrying a physical feedback shared channel (PSFCH) associated with one or more PSSCHs of one or more preceding slots; and transmit the sidelink resource configuration to one or more user equipments (UEs) associated with communication of the first PSSCH, the second PSSCH, the PSFCH, or a combination thereof.

Clause 101. The non-transitory computer-readable medium of clause 100, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

Clause 102. The non-transitory computer-readable medium of any of clauses 100 to 101, wherein the PSFCH comprises a set of symbols, and wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots.

Clause 103. The non-transitory computer-readable medium of clause 102, wherein each PSFCH resource among the first set of PSFCH resources and the second set of PSFCH resources comprises a physical resource block (PRB) index and an initial cyclic shift, or wherein the set of symbols comprises multiple PSFCH symbol repetitions, or a combination thereof.

Clause 104. The non-transitory computer-readable medium of any of clauses 102 to 103, wherein the first set of PSFCH resources is determined based at least in part upon a first index associated with the first mini-slot, and wherein the second set of PSFCH resources is determined based at least in part upon a second index associated with the second mini-slot.

Clause 105. The non-transitory computer-readable medium of clause 104, wherein the first index corresponds to a first mini-slot order index and the second index corresponds to a second mini-slot order index.

Clause 106. The non-transitory computer-readable medium of any of clauses 104 to 105, wherein the first index corresponds to a first symbol index and the second index corresponds to a second symbol index.

Clause 107. The non-transitory computer-readable medium of clause 106, wherein the first symbol index corresponds to an initial symbol index of the first mini-slot and the second symbol index corresponds to an initial symbol index of the second mini-slot.

Clause 108. The non-transitory computer-readable medium of any of clauses 104 to 107, wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

Clause 109. The non-transitory computer-readable medium of clause 108, wherein the first PSFCH resource is determined based at least in part upon a first index associated with the first PSSCH and a first slot position of the first preceding slot, wherein the second PSFCH resource is determined based at least in part upon a second index associated with the second PSSCH and a second slot position of the second preceding slot, wherein the third PSFCH resource is determined based at least in part upon a third index associated with the third PSSCH and the first slot position of the first preceding slot, and wherein the fourth PSFCH resource is determined based at least in part upon a fourth index associated with the fourth PSSCH and the second slot position of the second preceding slot.

Clause 110. The non-transitory computer-readable medium of any of clauses 102 to 109, wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

Clause 111. The non-transitory computer-readable medium of any of clauses 102 to 110, wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

Clause 112. The non-transitory computer-readable medium of any of clauses 102 to 111, wherein the first set of PSFCH resources comprises a first resource block (RB) index and a first initial cyclic shift, and is determined based at least in part upon a first slot index associated with the first mini-slot, and wherein the second set of PSFCH resources comprises a second RB index and a second initial cyclic shift, and is determined based at least in part upon a second slot index associated with the second mini-slot.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots; and
communicate, via the at least one transceiver, data over at least a portion of the slot in accordance with the sidelink resource configuration;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots; and
wherein the set of symbols comprises multiple PSFCH symbol repetitions.

2. The UE of claim 1, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

3. The UE of claim 1, wherein each PSFCH resource among the first set of PSFCH resources and the second set of PSFCH resources comprises a physical resource block (PRB) index and an initial cyclic shift.

4. A user equipment (UE), comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and a third set of resources carrying a physical feedback shared channel (PSFCH) associated with one or more PSSCHs of one or more preceding slots; and
communicate, via the at least one transceiver, data over at least a portion of the slot in accordance with the sidelink resource configuration;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots;
wherein the first set of PSFCH resources is determined based at least in part upon a first index associated with the first mini-slot, and
wherein the second set of PSFCH resources is determined based at least in part upon a second index associated with the second mini-slot.

5. The UE of claim 4, wherein the first index corresponds to a first mini-slot order index and the second index corresponds to a second mini-slot order index.

6. The UE of claim 4, wherein the first index corresponds to a first symbol index and the second index corresponds to a second symbol index.

7. The UE of claim 6, wherein the first symbol index corresponds to an initial symbol index of the first mini-slot and the second symbol index corresponds to an initial symbol index of the second mini-slot.

8. A user equipment (UE), comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots; and
communicate, via the at least one transceiver, data over at least a portion of the slot in accordance with the sidelink resource configuration;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots;
wherein the first set of PSFCH resources comprises
a first PSFCH resource associated with a first PSSCH, the first PSSCH corresponding to a first PSSCH in a first preceding slot, and
a second PSFCH resource associated with a second PSSCH, the second PSSCH corresponding to a first PSSCH in a second preceding slot, and
wherein the second set of PSFCH resources comprises
a third PSFCH resource associated with a third PSSCH, the third PSSCH corresponding to a second PSSCH in the first preceding slot, and
a fourth PSFCH resource associated with a fourth PSSCH, the fourth PSSCH corresponding to a second PSSCH in the second preceding slot.

9. The UE of claim 8,
wherein the first PSFCH resource is determined based at least in part upon a first index associated with the first PSSCH and a first slot position of the first preceding slot,
wherein the second PSFCH resource is determined based at least in part upon a second index associated with the second PSSCH and a second slot position of the second preceding slot,
wherein the third PSFCH resource is determined based at least in part upon a third index associated with the third PSSCH and the first slot position of the first preceding slot, and
wherein the fourth PSFCH resource is determined based at least in part upon a fourth index associated with the fourth PSSCH and the second slot position of the second preceding slot.

10. A user equipment (UE), comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots; and
communicate, via the at least one transceiver, data over at least a portion of the slot in accordance with the sidelink resource configuration;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots; and
wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

11. A user equipment (UE), comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots; and communicate, via the at least one transceiver, data over at least a portion of the slot in accordance with the sidelink resource configuration;

wherein the PSFCH comprises a set of symbols;

wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots; and wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

12. A user equipment (UE), comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots; and
communicate, via the at least one transceiver, data over at least a portion of the slot in accordance with the sidelink resource configuration;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots;
wherein the first set of PSFCH resources comprises a first resource block (RB) index and a first initial cyclic shift, and is determined based at least in part upon a first slot index associated with the first mini-slot; and
wherein the second set of PSFCH resources comprises a second RB index and a second initial cyclic shift, and is determined based at least in part upon a second slot index associated with the second mini-slot.

13. The UE of claim 1,
wherein the communication comprises transmission of data on the first PSSCH,
wherein the communicated data comprises data received on the first PSSCH,
wherein the communicated data comprises data transmitted on the PSFCH,
wherein the communicated data comprises data received on the PSFCH,
wherein the communicated data comprises data transmitted on the second PSSCH,
wherein the communicated data comprises data received on the second PSSCH,
or a combination thereof.

14. A sidelink management device, comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots;
transmit, via the at least one transceiver, the sidelink resource configuration to one or more user equipments (UEs) associated with communication of the first PSSCH, the second PSSCH, the PSFCH, or a combination thereof;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots; and
wherein each PSFCH resource among the first set of PSFCH resources and the second set of PSFCH resources comprises a physical resource block (PRB) index and an initial cyclic shift, or
wherein the set of symbols comprises multiple PSFCH symbol repetitions, or a combination thereof.

15. The sidelink management device of claim 14, wherein the PSFCH provides a positive acknowledgment or a negative acknowledgment to each of a corresponding first PSSCH and a corresponding second PSSCH, the corresponding first PSSCH and the corresponding second PSSCH corresponding to the one or more PSSCHs of the one or more preceding slots.

16. A sidelink management device, comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots;
transmit, via the at least one transceiver, the sidelink resource configuration to one or more user equipments (UEs) associated with communication of the first PSSCH, the second PSSCH, the PSFCH, or a combination thereof;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots;
wherein the first set of PSFCH resources is determined based at least in part upon a first index associated with the first mini-slot; and
wherein the second set of PSFCH resources is determined based at least in part upon a second index associated with the second mini-slot.

17. The sidelink management device of claim 16, wherein the first index corresponds to a first mini-slot order index and the second index corresponds to a second mini-slot order index.

18. The sidelink management device of claim 16, wherein the first index corresponds to a first symbol index and the second index corresponds to a second symbol index.

19. The sidelink management device of claim 18, wherein the first symbol index corresponds to an initial symbol index of the first mini-slot and the second symbol index corresponds to an initial symbol index of the second mini-slot.

20. The sidelink management device of claim 16,
wherein the first set of PSFCH resources comprises a first PSFCH resource associated with a first PSSCH, the first PSSCH corresponding to a first PSSCH in a first preceding slot, and a second PSFCH resource associated with a second PSSCH, the second PSSCH corresponding to a first PSSCH in a second preceding slot, and
wherein the second set of PSFCH resources comprises a third PSFCH resource associated with a third PSSCH, the third PSSCH corresponding to a second PSSCH in the first preceding slot, and a fourth PSFCH resource associated with a fourth PSSCH, the fourth PSSCH corresponding to a second PSSCH in the second preceding slot.

21. The sidelink management device of claim 20,
wherein the first PSFCH resource is determined based at least in part upon a first index associated with the first PSSCH and a first slot position of the first preceding slot,
wherein the second PSFCH resource is determined based at least in part upon a second index associated with the second PSSCH and a second slot position of the second preceding slot,
wherein the third PSFCH resource is determined based at least in part upon a third index associated with the third PSSCH and the first slot position of the first preceding slot, and
wherein the fourth PSFCH resource is determined based at least in part upon a fourth index associated with the fourth PSSCH and the second slot position of the second preceding slot.

22. A sidelink management device, comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots;
transmit, via the at least one transceiver, the sidelink resource configuration to one or more user equipments (UEs) associated with communication of the first PSSCH, the second PSSCH, the PSFCH, or a combination thereof;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots; and
wherein, for each PSFCH resource among the first set of PSFCH resources and the second set of PSFCH resources for a respective PSSCH, a first cyclic shift offset associated with a positive acknowledgement and a second cyclic shift offset associated with a negative acknowledgement are fixed.

23. A sidelink management device, comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots;
transmit, via the at least one transceiver, the sidelink resource configuration to one or more user equipments (UEs) associated with communication of the first PSSCH, the second PSSCH, the PSFCH, or a combination thereof;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots; and
wherein, for each PSFCH resource among the first set of PSFCH resources and the second set of PSFCH resources for a respective PSSCH, a first cyclic shift offset associated with a negative acknowledgement is determined based at least in part upon a respective index of a respective mini-slot associated with the PSFCH resource.

24. A sidelink management device, comprising:
a memory;
at least one transceiver; and
at least one processor communicatively coupled to the memory and the at least one transceiver, the at least one processor configured to:
determine a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and a third set of resources carrying a physical feedback shared channel (PSFCH) associated with one or more PSSCHs of one or more preceding slots;
transmit, via the at least one transceiver, the sidelink resource configuration to one or more user equipments (UEs) associated with communication of the first PSSCH, the second PSSCH, the PSFCH, or a combination thereof;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots;
wherein the first set of PSFCH resources comprises a first resource block (RB) index and a first initial cyclic shift, and is determined based at least in part upon a first slot index associated with the first mini-slot; and
wherein the second set of PSFCH resources comprises a second RB index and a second initial cyclic shift, and is determined based at least in part upon a second slot index associated with the second mini-slot.

25. A method of operating a user equipment (UE), comprising:
determining a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots;
communicating data over at least a portion of the slot in accordance with the sidelink resource configuration;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots;
wherein the first set of PSFCH resources is determined based at least in part upon a first index associated with the first mini-slot, and
wherein the second set of PSFCH resources is determined based at least in part upon a second index associated with the second mini-slot.

26. A method of operating a sidelink management device, comprising:
determining a sidelink resource configuration for a slot, wherein the sidelink resource configuration includes:
a first set of resources carrying a first physical sidelink shared channel (PSSCH) in a first mini-slot of the slot,
a second set of resources carrying a second PSSCH in a second mini-slot of the slot, and
a third set of resources carrying a physical feedback shared channel (PSFCH) associated with one or more PSSCHs of one or more preceding slots; and
transmitting the sidelink resource configuration to one or more user equipments (UEs) associated with communication of the first PSSCH, the second PSSCH, the PSFCH, or a combination thereof;
wherein the PSFCH comprises a set of symbols;
wherein each symbol of the set of symbols comprises a first set of PSFCH resources associated with a corresponding first PSSCH, and a second set of PSFCH resources associated with a corresponding second PSSCH, the corresponding first PSSCH and the corresponding second PSSCH corresponding to the one or more PSSCHs of the one or more preceding slots;
wherein the first set of PSFCH resources is determined based at least in part upon a first index associated with the first mini-slot; and
wherein the second set of PSFCH resources is determined based at least in part upon a second index associated with the second mini-slot.

* * * * *